United States Patent
Shibayama et al.

(10) Patent No.: US 7,406,688 B2
(45) Date of Patent: Jul. 29, 2008

(54) PARALLEL PROCESS EXECUTION METHOD AND MULTIPROCESSOR COMPUTER

(75) Inventors: Satoki Shibayama, Kawasaki (JP);
Yusuke Matsushima, Kawasaki (JP);
Kaoru Kikushima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 935 days.

(21) Appl. No.: 10/648,181

(22) Filed: Aug. 26, 2003

(65) Prior Publication Data

US 2004/0064817 A1 Apr. 1, 2004

Related U.S. Application Data

(63) Continuation of application No. PCT/JP01/01532, filed on Feb. 28, 2001.

(51) Int. Cl.
*G06F 9/46* (2006.01)
(52) U.S. Cl. ........................ 718/102; 718/101; 718/103; 718/107; 718/108
(58) Field of Classification Search .......... 718/100–108
See application file for complete search history.

(56) References Cited

U.S. PATENT DOCUMENTS 6,052,707 A 4/2000 D'Souza

FOREIGN PATENT DOCUMENTS

JP 10-074150 3/1998

OTHER PUBLICATIONS

Minoru Tanaka et al., "Parallelnavi : A Development and Job Execution Environment for Parallel Programs on PrimePower", Fujitsu, vol. 52, No. 1, Jan. 2001 (Tokyo), pp. 94-99, p. 98 pertinent.
Yuji Koeda, "Operating System of the VX/VPP300/VPP700 Series of Vector-Parallel Supercomputer Systems", Fujitsu, vol. 47, No. 6, Nov. 1996 (Tokyo), pp. 442-449.
D. Feitelson, "Job Scheduling in Multiprogrammed Parallel Systems", IBM Research Report RC19790 (87657) Second Revision (1997-98).
Atushi Hori, "Bunsan Kioku Hoshiki Keiretsu Keisanki no tame no Kouritsuteki Jibunkatsu Scheduling no Kenkyuu", Tokyo Daigaku Kougaku Kenkyuuuka Hakushi Ronbun, ' Mar. 1999, pp. 31-32.

(Continued)

*Primary Examiner*—Meng-Al T. An
*Assistant Examiner*—Lilian Vo
(74) *Attorney, Agent, or Firm*—Greer, Burns & Crain, Ltd.

(57) ABSTRACT

A parallel process execution method that allocates CPU time to parallel processes at any desired ratios. The method sets a time allocation ratio to determine how much of a given cycle period should be allocated for execution of a parallel program. Process switching is then performed in accordance with the time allocation ratio set to the parallel program. More specifically, parallel processes produced from a parallel program are each assigned to a plurality of processors, and those parallel processes are started simultaneously on the processors. When the time elapsed since the start of the parallel processes has reached a point that corresponds to the time allocation ratio that has been set to the parallel program, the execution of the assigned parallel processes is stopped simultaneously on the plurality of processors.

8 Claims, 18 Drawing Sheets

OTHER PUBLICATIONS

Yuji Koeda; Operating System of the VX/VPP300/VPP700 Series of Vector-Parallel Supercomputer Systems; Fujitsu-Scientific and Technical Journal, Fujitsu Ltd., Kawasaki, Japan; Vo. 33, No. 1; pp. 15-23; Jun. 1997.

Dror G. Feitelson; "Job Scheduling in Multiprogrammed Parallel Systems"; IBM Research Report, San Jose, CA; pp. 1-4; Aug. 1997.

Lagerstrom et al.; "PscheD Political Schedling on the Cray T3E"; Proceedings of the Job Scheduling Strategies for Parallel Processing; vol. 1291, pp. 1-18; Apr. 5, 1997.

31 TIME SLOT ALLOCATION MAP

| | #0 | #1 | #2 | #3 | #4 | #5 | #6 | #7 | #8 | #9 |
|---|---|---|---|---|---|---|---|---|---|---|
| | | | | TIME SLOT NUMBER | | | | | | |
| CPU #0 | A | A | A | B | B | D | F | F | F | T |
| CPU #1 | A | A | A | B | B | D | F | F | F | T |
| CPU #2 | A | A | A | C | C | E | F | F | F | T |
| CPU #3 | A | A | A | C | C |   | F | F | F | T |

FREE

FIG. 4

PARALLEL PROCESS EXECUTION METHOD AND MULTIPROCESSOR COMPUTER

This Application is a continuing application, filed under 35 U.S.C. § 111(a), of International Application PCT/JP01/01532, filed on Feb. 28, 2001.

BACKGROUND OF THE INVENTION

1. Field of the Invention

The present invention relates to a parallel process execution method, a multiprocessor computer, a parallel process execution program, and a storage medium storing that program. More particularly, the present invention relates to a parallel process execution method that executes parallel processes and other processes in a time-shared manner, a multiprocessor computer to perform that method, a parallel process execution program to make a computer perform that method, and a storage medium storing that program.

2. Description of the Related Art

A computer composed of a plurality of processors (multiprocessor computer) can execute a single program with a plurality of processors in a parallel fashion. Programs that can be executed in parallel will hereafter be called parallel programs. To execute a parallel program, a plurality of parallel processes are produced from it, which can run concurrently with each other. Those parallel processes produced are given to different processors for parallel execution. The processors accomplish a series of processing tasks encoded in the parallel program, exchanging data with each other. Here we use the term "process" to refer to a unit task containing at least one thread. By the term "processors," we mean processing elements which are known as, for example, central processing unit (CPU) or micro processing units (MPU). In the rest of this section, we use the term "CPU" to refer to such processing elements for reasons of expediency.

Parallel processes have some checkpoints at which each process communicate, or synchronize, with other related processes by exchanging data. Think of two CPUs executing parallel processes that involve each other's data. These two CPUs first proceed on their own until they reach a checkpoint and become ready to exchange their data. If one process has reached the checkpoint earlier than the other, the CPU of that process has to wait until the peer process also reaches the checkpoint. This situation of the former CPU is referred to as the synchronization wait state.

Besides the synchronization wait, data processing on a CPU involves other types of wait times such as those related to input/output (I/O) operations. If those CPU wait times can be used to execute other processes, it will contribute positively to the efficiency of the entire system. This idea is actually implemented in the following way: each CPU is configured to operate in time sharing mode, and when the current process on a CPU has entered a wait state, some other process is assigned to that CPU. This additional process may be a parallel process or a non-parallel process that is supposed to run on a single CPU.

Consider that, since one parallel process has reached a checkpoint for data exchange with a peer process, the CPU is now running some other process using the synchronization wait period that follows. It could happen in this situation that the CPU is still engaged in that extra process even if the peer parallel process has also reached the checkpoint, and if this is the case, the peer CPU has to wait for synchronization. Such synchronization wait times would cause a reduction in the efficiency of the computer system.

To address the above issue, a process scheduling method is disclosed in the Unexamined Japanese Patent Publication No. 10-74150 (1998), in which a time-sharing computer system is configured to cause all constituent CPUs to start and stop parallel processes and other processes simultaneously at predetermined unit intervals (called "phase"). That is, the CPUs execute a plurality of parallel processes produced from a certain parallel program, stating and stopping them all at the same time. While synchronization wait times may arise in the course of parallel processes, the disclosed method keeps their time length equal to that in the case without time sharing. As a result, it minimizes the amount of waiting time for synchronization between parallel processes constituting a parallel program, thus preventing the system's efficiency from decreasing.

Meanwhile, some kinds of computer processes require that their turnaround time (the time from start to complete) be guaranteed. One example of such processes is weather data analysis. This process has to analyze a huge amount of weather data in a limited time frame, i.e., a predetermined time before scheduled delivery of a new piece of weather forecast information.

The process scheduling method proposed in the above-mentioned publication, however, is unable to provide guaranteed turnaround time for each parallel program because of its fixed-length phase. For example, there may be such a parallel program that would need 50 percent of the computation power of a multiprocessor computer to ensure its required turnaround time. The above-described process scheduling method can only allocate one phase (e.g., 10 percent) of time resources to that parallel program and thus is unable to guarantee the turnaround time.

SUMMARY OF THE INVENTION

In view of the foregoing, it is an object of the present invention to provide a parallel process execution method, as well as a multiprocessor computer, a parallel process execution program, and a storage medium storing that program, that can allocate CPU time for each parallel process at a desired ratio.

To accomplish the above object, according to the present invention, there is provided a parallel process execution method with which a plurality of processors execute a plurality of parallel processes produced from a parallel program together with other processes in a time-shared fashion. This method comprising the following steps: (a) setting a time allocation ratio that determines how much of a given cycle period should be allocated for execution of the parallel program; (b) assigning each parallel process of the parallel program to one of the plurality of processors, and starting execution of the assigned parallel processes simultaneously on the plurality of processors; and (c) stopping the execution of the assigned parallel processes simultaneously on the plurality of processors, when the time elapsed since the start of the parallel processes has reached a point that corresponds to the time allocation ratio that has been set to the parallel program to allocate the given cycle period.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 shows an example of a time slot allocation map.

DESCRIPTION OF THE PREFERRED EMBODIMENTS

Figure 1:
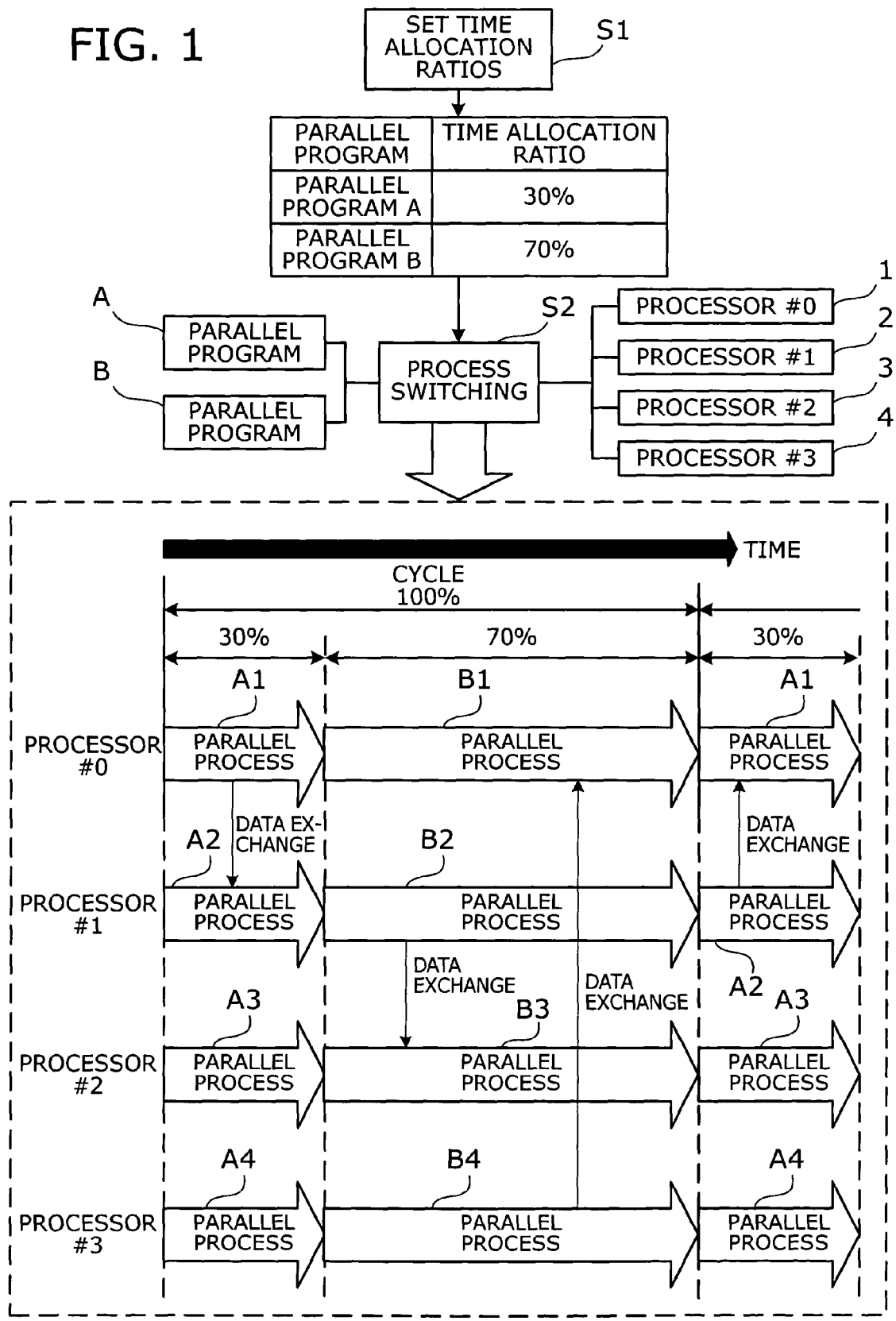
FIG. 1 is a conceptual view of the present invention.

Preferred embodiments of the present invention will be described below with reference to the accompanying drawings, wherein like reference numerals refer to like elements throughout.

FIG. 1 is a conceptual view of the present invention. According to the parallel process execution method of the present invention, a multiprocessor computer having a plurality of processors 1 to 4 (with IDs #0 to #3, respectively) is designed to execute parallel programs in a time-shared manner. In the example of FIG. 1, two parallel programs A and B are executed in a time-shared manner.

First of all, each parallel program A and B is given a time allocation ratio as shown in FIG. 1 (step S1). Time allocation ratios determine how much part of a given cycle period the individual process derived from each parallel program can occupy. In the example of FIG. 1, the time allocation ratio of parallel program A is set to 30%, while that of parallel program B is set to 70%.

Subsequently, process switching operations take place between one group of parallel processes A1 to A4 and the other group of parallel processes B1 to B4 according to the time allocation ratios assigned to their original parallel programs A and B (step S2). During this process switching, the first group of parallel processes A1 to A4 run concurrently on their respective processors, being started at the same time. When the time elapsed since the start of those parallel processes A1 to A4 has reached the point defined by the time allocation ratio (30%) of the parallel program A, within the given cycle period, the processors 1 to 4 stop the parallel processes A1 to A4 all together.

Now that the parallel processes A1 to A4 have stopped at a time, the processors 1 to 4 now begin to run the second group of parallel processes B1 to B4. When the time elapsed since the start of those parallel processes B1 to B4 has reached the point defined by the time allocation ratio (70%) of the parallel program B, within the given cycle period, the processors 1 to 4 stop the parallel processes B1 to B4 all together.

The processors 1 to 4 exchange data with each other as necessary, during the course of execution of a plurality of parallel processes produced from each single parallel program. FIG. 1 specifically illustrates such data exchange operations between parallel processes A1 and A2, B2 and B3, and B1 and B4.

As can be seen from the above, the present invention permits a time-sharing multiprocessor computer to set any desired time allocation ratios for parallel processes produced from each parallel program. The present invention allocates fractions of the given cycle time to parallel processes in proportion to their time allocation ratio, thereby ensuring the turnaround. In addition, parallel processes produced from a single parallel program are controlled such that they will start at the same time and stop at the same time. This prevents the parallel processes from experiencing increased synchronization wait times, which would otherwise occur in exchanging data when the time sharing technique is applied.

The following is a more specific explanation of the embodiment of the present invention. In the following explanation, we use the term "CPUs" to refer to the processors mentioned above.

Figure 2:
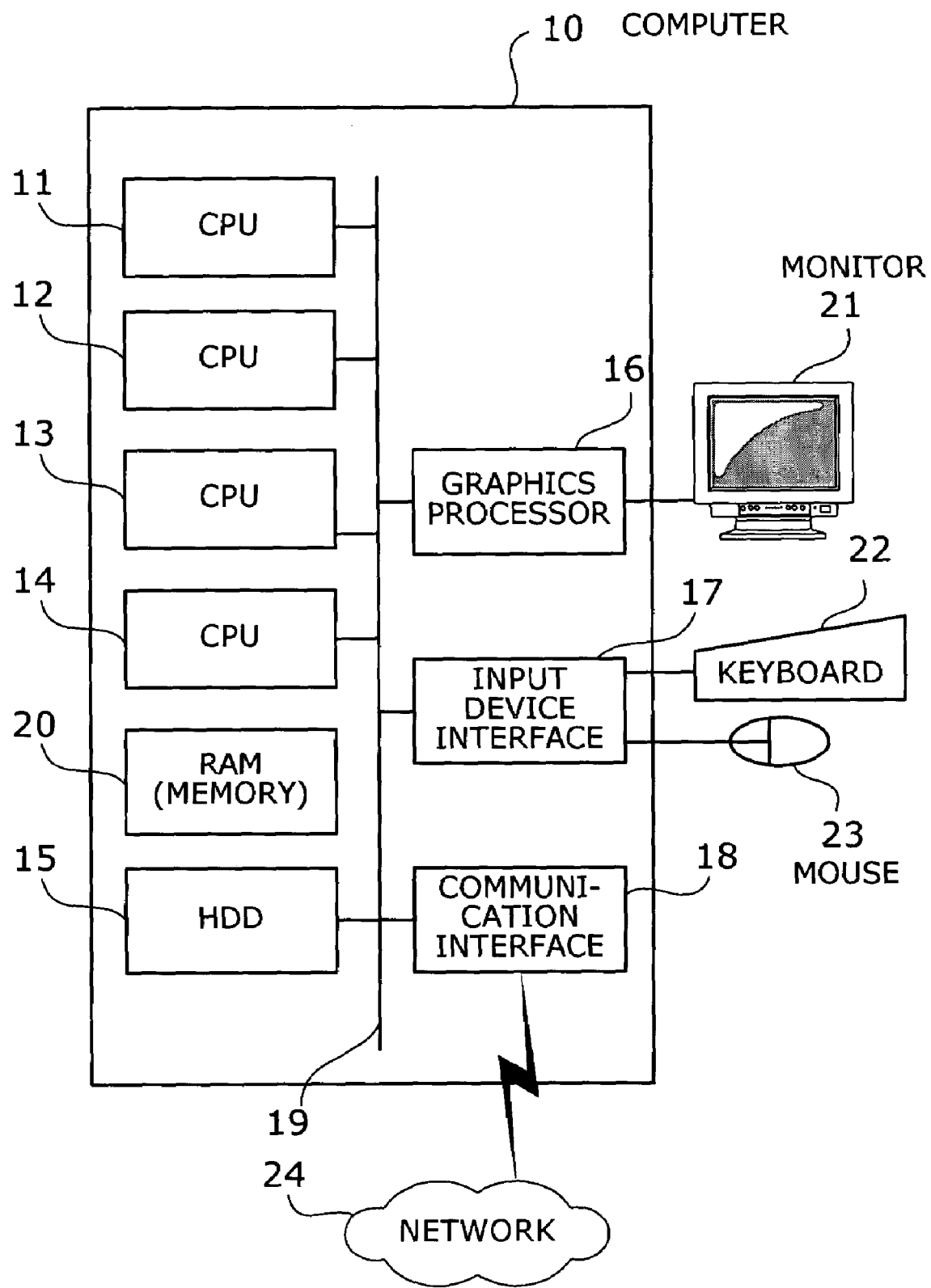
FIG. 2 shows an example hardware configuration of a multiprocessor computer in which the present invention is embodied.

FIG. 2 shows an example hardware configuration of a multiprocessor computer in which the present invention is embodied. The computer 10 is controlled in its entirety by a plurality of CPUs 11 to 14. The CPUs 11 to 14 are connected with each other through a bus 19. The CPUs 11 to 14 execute processes produced according to shared programs and others stored in a RAM 20. Connected to each CPU 11 to 14 through the bus 19 are: a RAM 20, a hard disk unit (HDD) 15, a graphics processor 16, an input device interface 17, and a communication interface 18.

The RAM 20 temporarily stores at least a part of operating system (OS) programs, as well as at least a part of parallel programs that the CPU 11 executes. Also, the RAM 20 stores data such as time slot allocation maps. The HDD 15 stores OS programs, parallel programs, non-parallel programs, and the like. Data necessary for execution of those various programs is also stored in the HDD 15. A monitor 21 is connected to the graphics processor 16. The graphics processor 16 produces and displays images on the screen of the monitor 21 according to the commands from the CPUs 11 to 14. A keyboard 22 and mouse 23 are connected to the input device interface 17. The input device interface 17 receives signals from the keyboard 22 and mouse 23 and supplies them to the CPUs 11 to 14 over the bus 19. The communication interface 18 is connected to a network 24, which is a wide area network such as the Internet. The network interface 18 allows the computer 10 to exchange data with other computers on the network.

The processing functions of the present embodiment are implemented on a hardware platform with the above-described structure. For example, when the computer shown in FIG. 2 is powered on, some of the operating system programs are loaded from the HDD 15 to the RAM 20 and executed by each CPU 11 to 14. The operating system thus starts functioning on each CPU 11 to 14.

Figure 3:
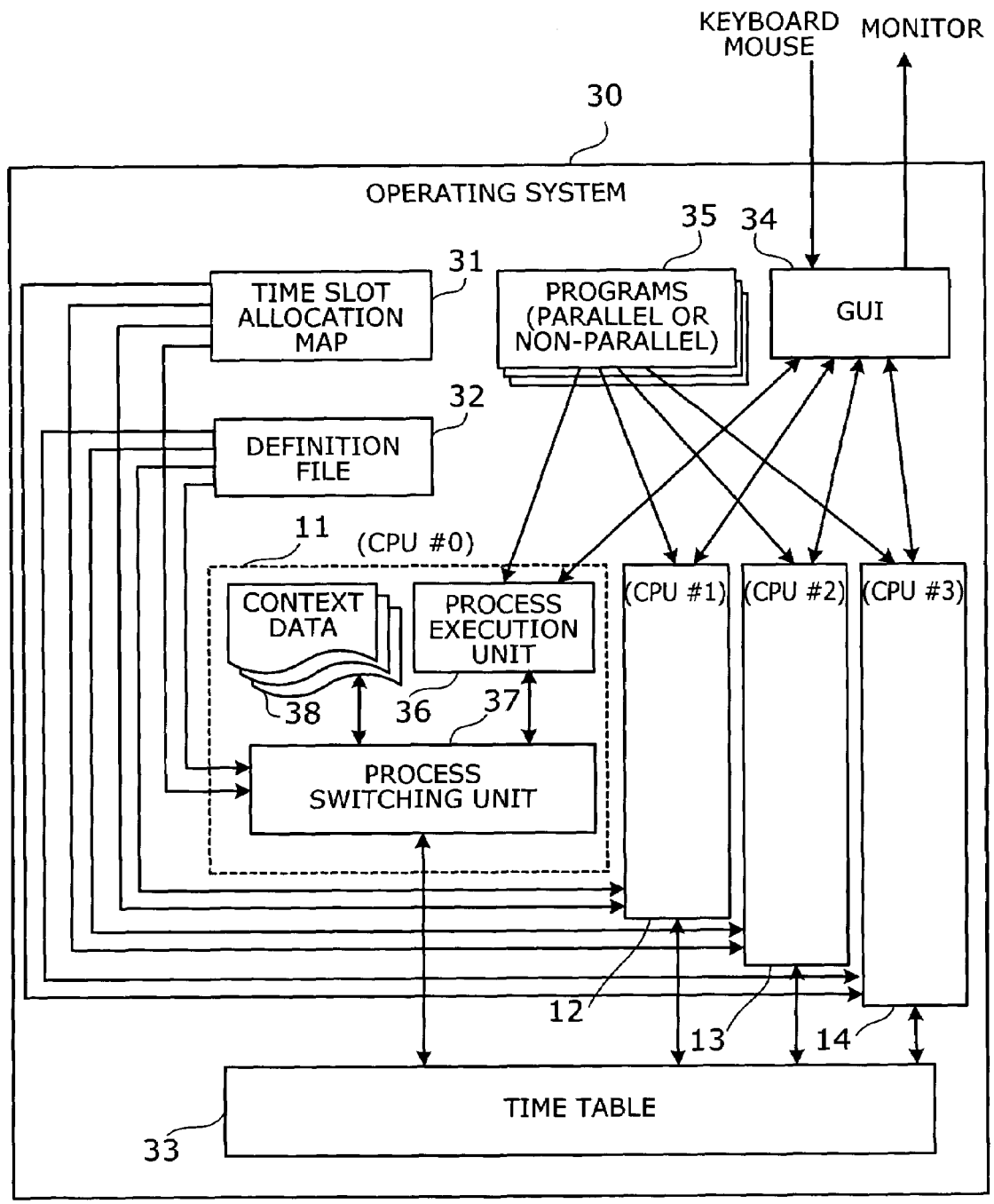
FIG. 3 is a block diagram which shows OS functions that realize the present embodiment.

FIG. 3 is a block diagram which shows operating system functions that realize the present embodiment. In the present embodiment, an operating system 30 is started up in the computer 10, which includes the following elements: a time slot allocation map 31, a definition file 32, a time table 33, a graphical user interface (GUI) 34, programs 35, a process execution units 36, a process switching unit 37, and contexts 38. Each CPU 11 to 14 has its own process execution unit 36, process switching unit 37, and context data 38. The operating system 30 identifies those individual CPUs 11 to 14 by using their respective identifiers CPU #0, CPU #1, CPU #2, and CPU #3.

The time slot allocation map 31 contains such data that defines a schedule of coordinated operations of multiple CPUs in process execution. The user can formulate a desired computation schedule through some data input operations for this time slot allocation map 31. Entries registered in this time slot allocation map 31 show which process each CPU is supposed to execute in each time slot. The CPUs #0 to #3 consult this time slot allocation map 31 to know which process is assigned to them in the current slot. More details about the time slot allocation map 31 will be given in a later section.

The definition file 32 includes the information on scheduling policies that provide a set of criteria in determining how to use time slots to which no processes are assigned in the time slot allocation map 31. Such scheduling policies include, for example, throughput-first policy and turnaround-first policy. Through data input operations, the user can choose his/her desired scheduling policy for use in process switching.

Throughput-first policy tries to maximize the throughput (the amount of processing per unit time) of the entire system. With this policy, CPUs execute some appropriate processes using time slots that have no processes allocated (called "free time slots") in an attempt to reduce their idle time as much as possible. The present embodiment assumes the following priorities of processes when executing them: interactive processes>non-parallel processes>parallel processes.

Turnaround-first policy, on the other hand, is a policy that tries to ensure the turnaround of a given parallel program. With this turnaround-first policy, the CPU usage of each process is restricted not to exceed its pre-assigned CPU allocation ratio. That is, no batch processes (neither parallel processes nor non-parallel processes) are allowed to run in a time slot that has no processes being allocated.

The time table 33 provides such data in table form that defines the starting time of each time slot relative to the beginning of the cycle period. The details of this time table 33 will be described later.

The GUI 34 parses input signals sent from the keyboard 22, mouse 23, or other input devices and produces various commands from them. The GUI 34 then sends the produced control commands to the process execution unit 36 to invoke an interactive process in it. Another task of the GUI 34 is to receive information from the process execution unit 36 and display it on the monitor 21.

The programs 35 include parallel programs and non-parallel programs. Parallel programs can be executed in parallel by a plurality of CPUs. Non-parallel programs are intended for execution on a single CPU. Each of those programs 35 is loaded, wholly or partly, from the HDD 15 to the RAM 20, for example.

The process execution unit 36 produces processes (parallel processes and non-parallel processes), based on the programs 35 and the commands sent from the GUI 34, and executes the produced processes in a time-shared fashion. The process execution unit 36 also communicates with other CPU's process execution unit to exchange data when their ongoing parallel processes have reached a checkpoint where a data exchange operation (synchronization) has to take place.

The process switching unit 37 controls switching of processes being executed by the process execution unit 36. More specifically, the process switching unit 37 looks up the time table 33 to determine the start time of a time slot, and when the start time is reached, it determines which processes to execute in that time slot by consulting the time slot allocation map 31.

In the case the time slot allocation map 31 shows no particular process allocated in the time slot that is coming, the process switching unit 37 first refers to the definition file 32. According to the current scheduling policy found in the definition file 32, the process switching unit 37 then determines which processes to execute in the upcoming time slot. Once it has determined the process for the upcoming time slot, the process switching unit 37 makes the process execution unit 36 stop the current process and performs context switching. That is, it saves the context of the current process that the process execution unit 36 has executed so far and supplies the process execution unit 36 with a new context that the next process requires in its execution. The context data 38 are control information that is necessary to execute or resume each individual process. Each set of context data 38 includes such a piece of information as the program counter value at the time when a process is interrupted.

FIG. 4 shows an example of the time slot allocation map. In the example of FIG. 4, one cycle period is divided into ten time slots, which are assigned time slot numbers #0 to #9. For each of the four CPUs #0 to #3, the time slot allocation map 31 defines which process should be executed in each time slot #0 to #9.

More specifically, the first three time slots #0 to 2 of all CPUs #0 to #3 are assigned parallel processes that are produced from a first parallel program A. In the subsequent two time slots #3 and #4, two CPUs #0 and #1 are assigned parallel processes produced from a second parallel program B, while the other CPUs #2 and #3 are assigned different parallel processes produced from a third parallel program C. In the next time slot #5, the CPUs #0 and #1 are assigned parallel processes produced from a fourth parallel program D, and the CPU #2 is assigned a non-parallel process produced from a non-parallel program E. No process is assigned to the CPU #3 in this time slot #5, which is thus referred to as a free time slot. In the subsequent three time slots #6 to #8, all CPUs #0 to #3 are assigned parallel processes produced from a sixth parallel program F. In time slot #9, interactive processes T are assigned to all CPUs #0 to #3. In such a time slot with interactive processes, a plurality of interactive processes produced on the operating system are executed in the order of priority.

Figure 5:
FIG. 5 shows an example of a time table.

FIG. 5 shows an example of a time table. This time table 33 contains time offsets corresponding to individual time slot numbers. The time offset of a time slot gives the temporal position of its beginning, relative to the beginning of each single cycle period, which is assumed to be 1 sec in the present example.

In the example of FIG. 5, time slot #0 has a time offset of +0 msec. Time slot #1 has a time offset of +100 msec. Time slot #2 has a time offset of +200 msec. Time slot #3 has a time offset of +300 msec. Time slot #4 has a time offset of +400 msec. Time slot #5 has a time offset of +500 msec. Time slot #6 has a time offset of +600 msec. Time slot #7 has a time offset of +700 msec. Time slot #8 has a time offset of +800 msec. Time slot #9 has a time offset of +900 msec.

The time elapses in the CPUs since the start of a single cycle period. Each time it reaches the time corresponding to the time offset of a certain time slot, the time slot allocation map is referenced. A process switching operation takes place if the process that is scheduled to run in the next time slot is different from the current one. This is accomplished by changing the arrangement of process priorities.

Figure 6:
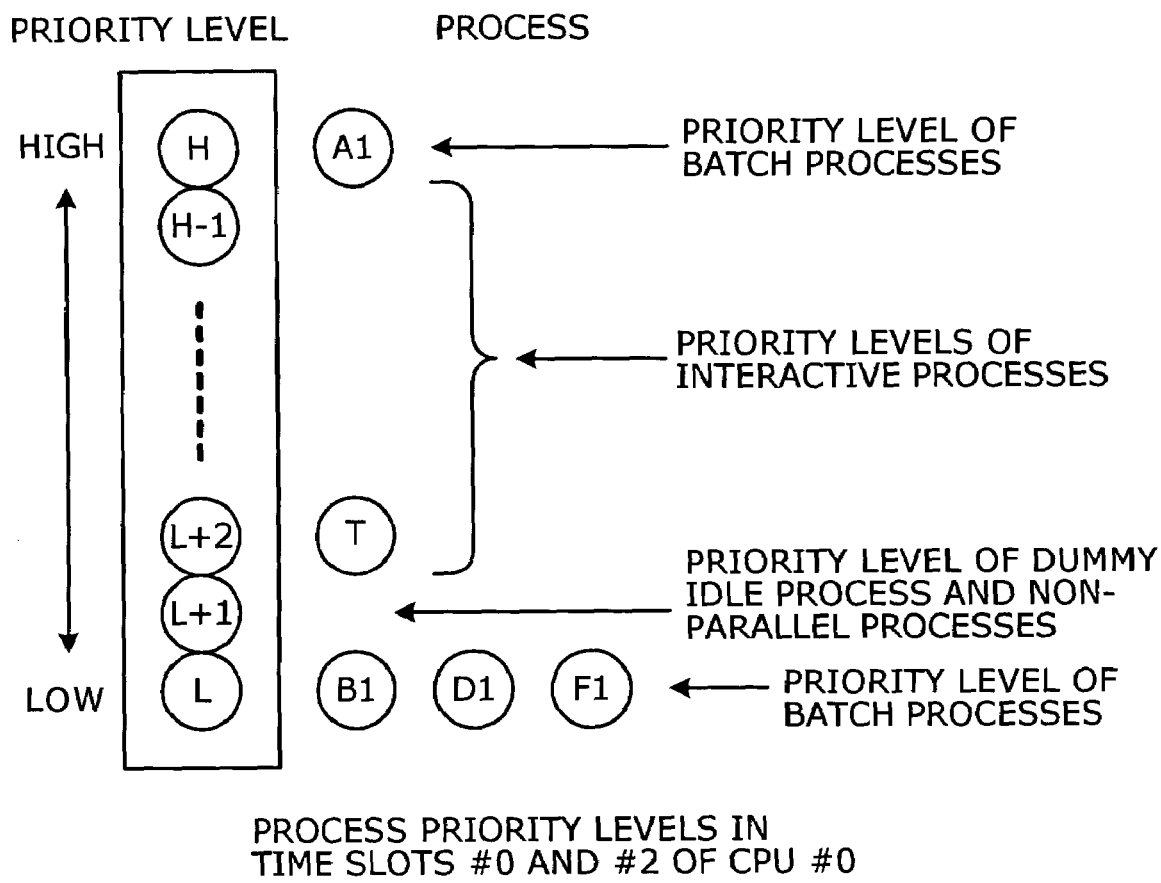
FIG. 6 shows process priority levels.

FIG. 6 shows priority levels of processes. The priory is classified into, for example, sixty or so levels. In the present example, the highest priority (H) and lowest priority (L) are used for batch processes. The present embodiment assumes that all non-parallel and parallel processes other than interactive processes are executed as batch processes. Priority levels between (H−1) and (L+2) are used for interactive processes, where (H−1) is immediately below the highest level (H) and (L+2) is two ranks higher than the lowest (L). Priority level (L+1), immediately above the lowest level (L), is used for dummy idle processes and non-parallel processes. Here, dummy idle processes are provided to avoid the execution of parallel processes. In executing a dummy idle process, the CPU repeats meaningless instructions, not performing any computational operations or other substantial tasks.

At every transition from one time slot to another, each CPU determines whether there is a process to execute in the next time slot, and if there is, it sets the priority of that process to the highest level (H), while changing those of other non-executing batch processes to the lowest level (L).

The example of FIG. 6 shows the priority of various processes in time slots #0 to #2 of CPU #0. Process A1 (a parallel process derived from a parallel program A) is given the highest priority level (H). Interactive process T is given a priority level (L+2), two levels above the lowest priority level (L). Processes with the lowest priority level (L) are: parallel process B1 (a parallel process produced from another parallel program B), parallel process D1 (a parallel process produced from a yet another parallel program D), and parallel process F1 (a parallel process produced from a still another parallel program F).

In time-sharing, the CPU executes one of the processes that has the highest priority at the time of process switching. Accordingly, in the example of FIG. 6, it is the process A1 that the CPU #0 actually executes. In the case all batch processes are given the lowest priority level (L), the CPU #0 executes the interactive process T.

Figure 7:
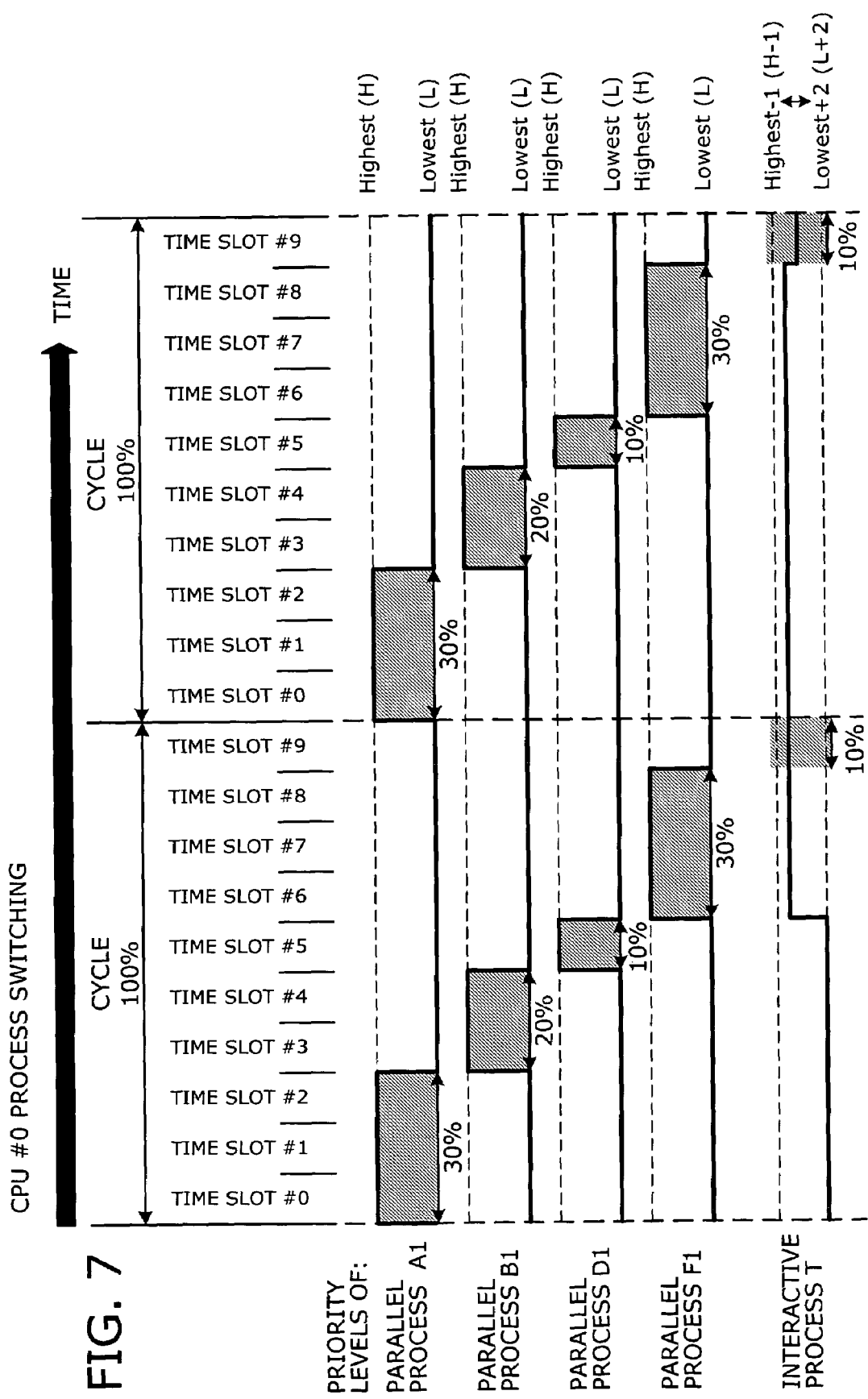
FIG. 7 is an example timing diagram that shows how processes are switched.

FIG. 7 is an example timing diagram that shows how processes are switched in the CPU #0. In this example, the parallel process A1 is given the highest priority level (H) at the start point of time slot #0, while other parallel processes remain in the lowest-priority (L) group. The interactive process T, on the other hand, is placed at a priority level between (L+2) and (H−1), where (L+2) is two ranks above the lowest (L) and (H−1) is immediately below the highest (H). As a result of the above arrangement, the parallel process A1 is executed in time slot #0 of the CPU #0.

The priorities of all processes stay unchanged at the start point of time slot #1, as well as at the start point of time slot #2, which permits the parallel process A1 to keep on running also in those two consecutive time slots #1 and #2. In this way, 30 percent of the cycle period is consumed by the parallel process A1.

At the start point of time slot #3, the priority of the parallel process A1 is set to the lowest (L), and that of another parallel process B1 is raised to the highest (H). The priorities of the other parallel processes remain unchanged. As a result, the CPU #0 executes the parallel process B1 in time slot #3. Since no processes change their priorities at the start point of time slot #4, the parallel process B1 keeps running in that time slot #4. In this way, 20 percent of the cycle period is consumed by the parallel process B1.

When the next time slot #5 begins, the parallel process B1 is given the lowest priority level (L), and instead, another parallel process D1 is raised to the highest (H). The other parallel processes remain in the same priority levels as before. Accordingly, the CPU #0 executes the parallel process D1 in time slot #5. In this way, 10 percent of the cycle period is consumed by the parallel process D1.

When the time slot is transitioned to #6, the priority of the parallel process D1 is set to the lowest (L), and the highest priority (H) is handed down to still another parallel process F1. This makes the CPU #0 execute the parallel process F1 in time slot #6. Since the processes do not change their priorities at the start point of time slot #7, nor of time slot #8, the same parallel process F1 occupies those two time slots #7 and #8 as well. In this way, 30 percent of the cycle period is consumed by the parallel process F1.

Now the final time slot #9 comes. The priority of the parallel process F1 is returned to the lowest (L), while the other parallel processes remain unchanged. The CPU #0 then executes interactive processes T, because their priority has become the highest in time slot #9. In this way, 10 percent of the cycle period is shared by the interactive processes T.

Figure 8:
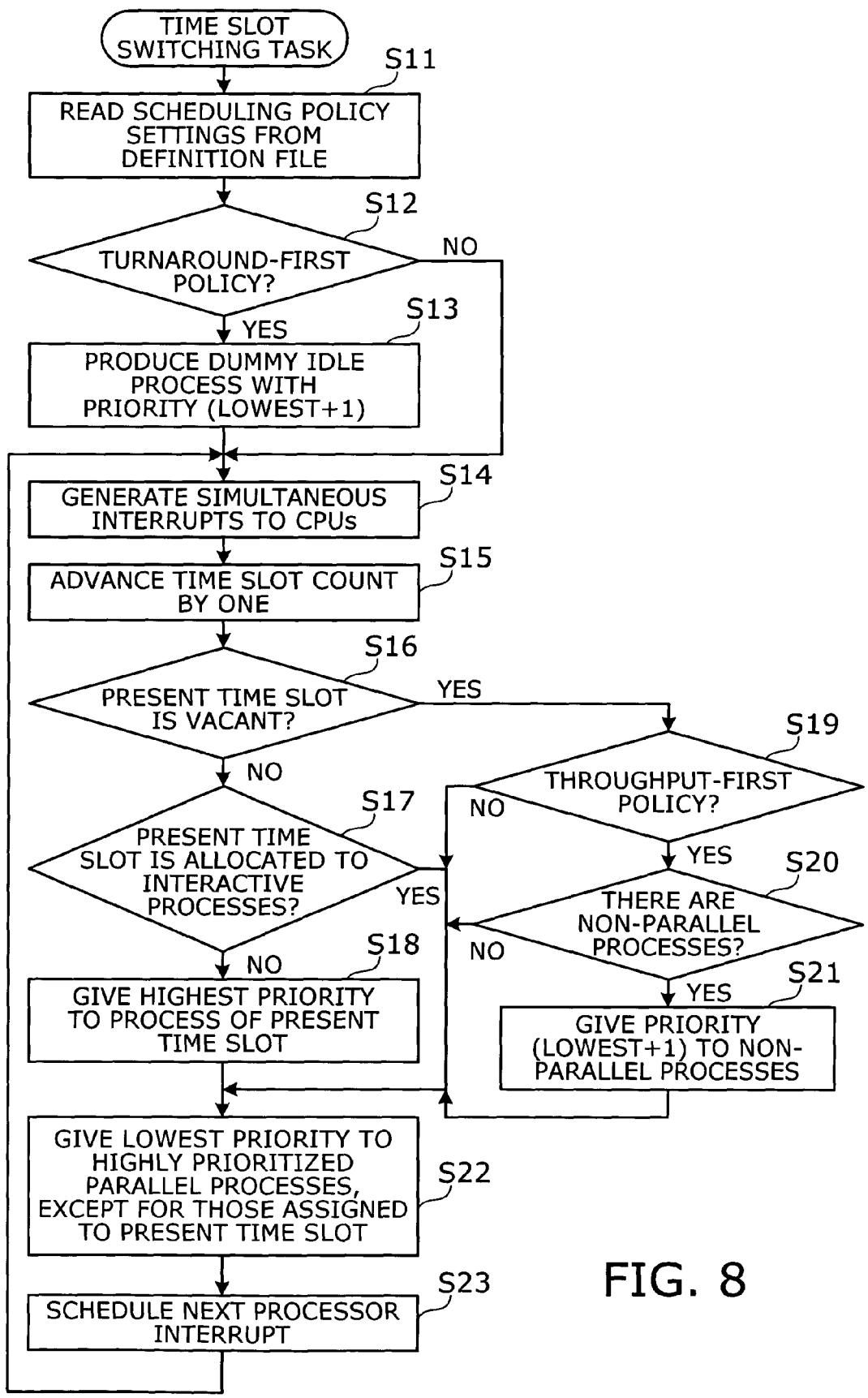
FIG. 8 is a flowchart that shows process switching performed at each time slot.

FIG. 8 is a flowchart that shows process switching performed at each time slot. This process switching task is executed at every CPU on which OS is running, each time a new time slot comes. The following explains the task of FIG. 8 in the order of step numbers shown therein.

(S11) The process switching unit 37 (shown in FIG. 3) reads scheduling policy settings from the definition file 32 (also shown in FIG. 3).

(S12) The process switching unit 37 determines whether the scheduling policy is turnaround-first. If it is turnaround-first, then the task proceeds to step S13. If not, it skips to step S14.

(S13) The process switching unit 37 produces a dummy idle process and gives to that process a priority level (L+1), which is immediately above the lowest priority level.

(S14) The process switching unit 37 generates simultaneous interrupts to the CPUs.

(S15) The process switching unit 37 advances the time slot count by one.

(S16) Consulting the time slot allocation map 31 (shown in FIG. 3), the process switching unit 37 determines whether the present time slot is free. If the present time slot is free, the task proceeds to step S19. If the present time slot is not free, the task proceeds to step S17.

(S17) Consulting the time slot allocation map 31, the process switching unit 37 determines whether the present time slot is allocated to interactive processes. If it are allocated to interactive processes, the task proceeds to step S22. If it is not, the task proceeds to step S18.

(S18) The process switching unit 37 gives the highest priority to the process that is assigned to the present time slot. After that, the task proceeds to step S22.

(S19) Now that it has been determined at step S16 that the present time slot is free, the process switching unit 37 consults the definition file 32 to determine whether the policy is throughput-first policy. If it is throughput-first policy, the task proceeds to step S20. If it is not, the task proceeds to step S22.

(S20) The process switching unit 37 determines whether there is a pending non-parallel process. If there is, the task proceeds to step S21. If not, the task proceeds to step S22.

(S21) The process switching unit 37 gives a priority level (L+1), which is immediately above the lowest priority level, to the non-parallel process identified.

(S22) The process switching unit 37 gives the lowest priority (L) to highly prioritized parallel processes, except for those assigned to the present time slot.

(S23) Consulting the time table 33, the process switching unit 37 sets when to generate processor interrupts next time. After that, the task returns to step S14.

The priority of each process can be varied for each time slot in the way described above, thus enabling processes to be switched according to a given time slot allocation map and scheduling policy. Suppose here that a turnaround-first policy has been given as the current scheduling policy. In this case, a dummy idle process with a priority of (L+1) is produced (step S13), and batch processes are given the lowest priority (L) in free time slots (step S22). As a result, interactive processes will be allowed to run if they exist, and if there are no such interactive processes, then the dummy idle process will gain the time slot instead. This eventually inhibits any effective batch processes from being executed in vacant time slots.

When, on the other hand, throughput-first policy is specified as the scheduling policy, non-parallel processes are given a priority of (L+1), immediately above the lowest (L), in free time slots (step S21), while parallel processes are set to the lowest priority (L) (step S22). As a result, interactive processes with a priority level in the range of (L+2) to (H−1) would be able to run if they exist. If there are no such interactive processes, then any existing non-parallel process would be executed instead. That is, the processes are prioritized in the following order: interactive processes, non-parallel processes, and parallel processes.

Figure 9:
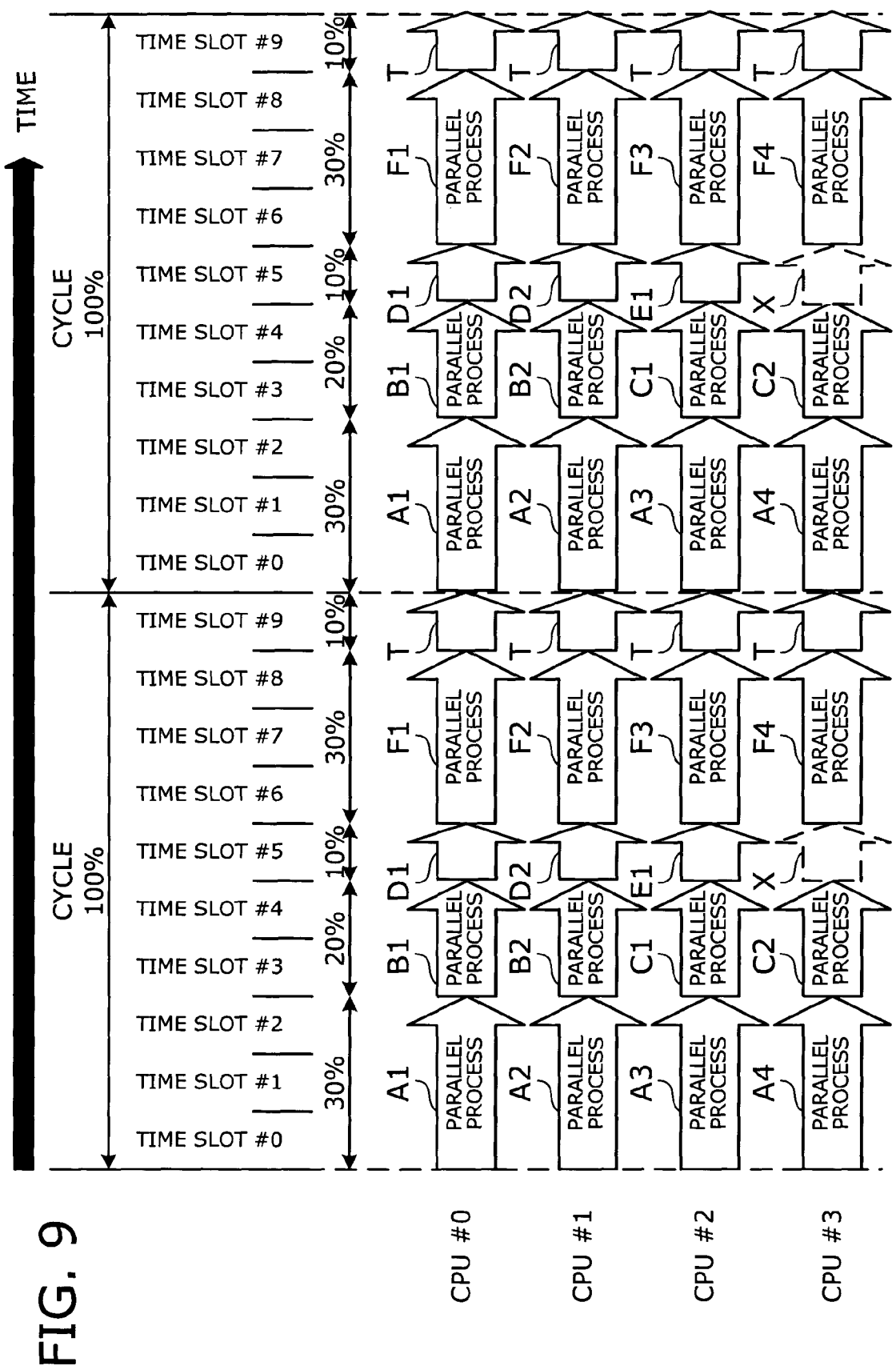
FIG. 9 shows a situation where processes are switched according to the time slot allocation map of FIG. 4.

FIG. 9 shows a situation where processes are switched according to the time slot allocation map of FIG. 4. The first three time slots #0 to #2 share 30 percent of the cycle period. As can be seen from FIG. 9, the CPU #0 executes a parallel process A1 during this period, the CPU #1 executes another parallel process A2, the CPU #2 executes yet another parallel process A3, and the CPU #3 executes still another parallel process A4. Here, the parallel processes A1 to A4 are all batch processes produced from a parallel program A.

The next two time slots #3 and #4 are 20 percent of the cycle period. During this period, the CPUs #0 and #1 execute a pair of parallel processes B1 and B2, and the CPUs #2 and #3 execute another pair of parallel processes C1 and C2. Here, the parallel processes B1 and B2 are both batch processes produced from a parallel program B. Likewise, the parallel process C1 and C2 are both batch processes produced from a parallel program C.

During the period of time slot #5, which is 10 percent of the cycle period, the CPUs #0 and #1 execute a pair of parallel processes D1 and D2, while the CPU #2 executes a non-parallel process E1. The CPU #3, on the other hand, executes a process X that has been determined according to the scheduling policy. Here, the parallel processes D1 and D2 are both batch processes produced from a parallel program D, and the non-parallel process E1 is a batch process produced from a non-parallel program E.

The subsequent three time slots #6 to #8 share 30 percent of the cycle period. The four CPUs #0 to #3 execute a set of parallel processes F1 to FIG. 4, respectively, all of which are batch processes produced from a parallel program F. In the last time slot #9, ten percent of the cycle period, the CPUs #0 to #3 execute their respective interactive processes T.

As can be seen from the above example, the time allocation ratio of each process can be freely specified for individual CPUs, which enables parallel programs to be executed with appropriate time allocation ratios as desired by the customers. In the next section, we will show several examples of time allocation ratios set for given processes. Specifically, the following examples assume a parallel program A which requires so much computation that four fully-dedicated parallel CPUs would need one day to finish it. They also assume another parallel program B which requires so much computation that four fully-dedicated parallel CPUs would need four days to finish it.

Figure 10:
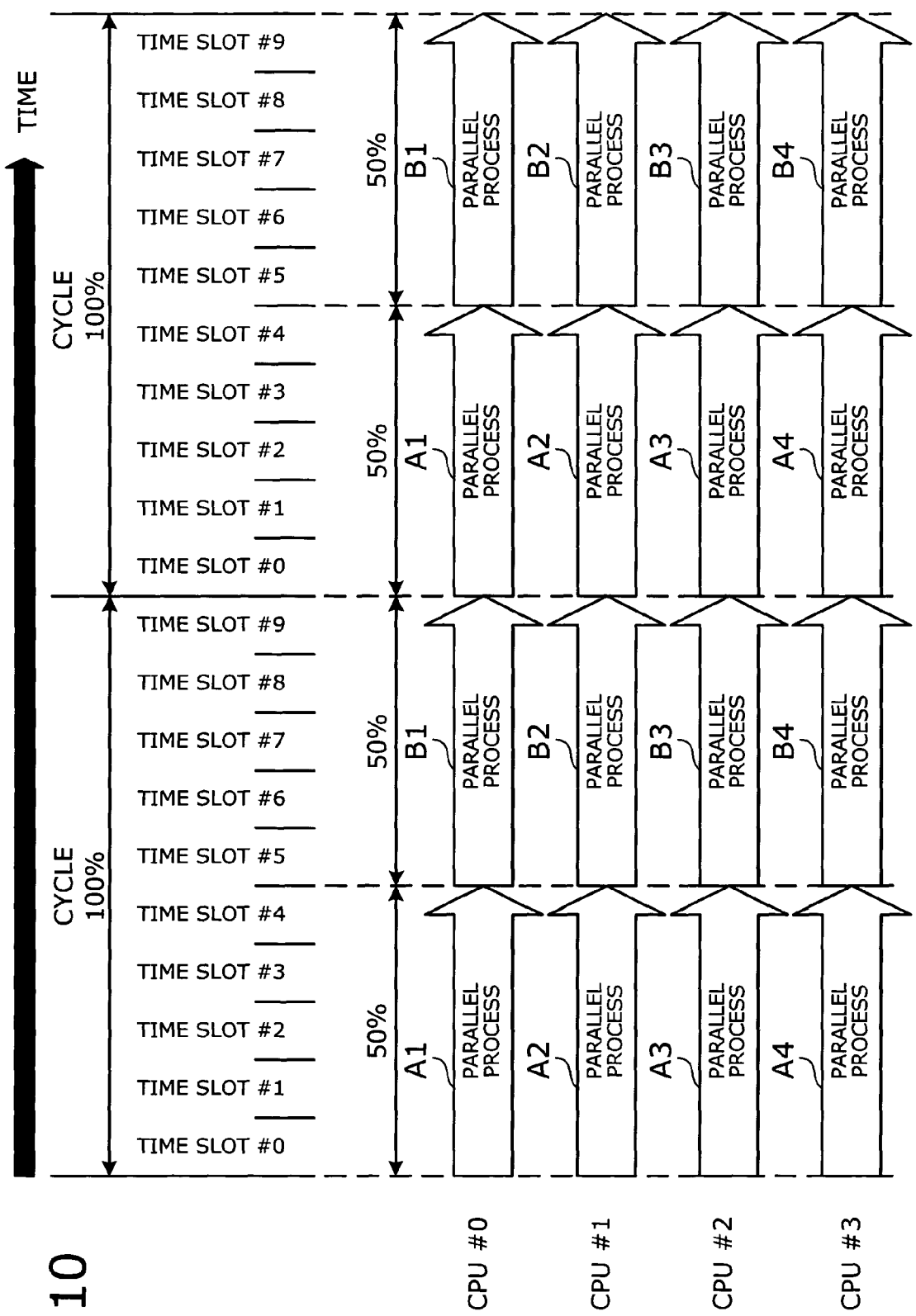
FIG. 10 shows an example of process switching when the time allocation ratio is set to 1:1.

FIG. 10 shows an example of process switching when the time allocation ratio is set to 1:1. In this example, the first parallel program A is assigned an allocation ratio of 50 percent (time slots #0 to #4), and the second parallel program B is assigned an allocation ratio of 50 percent (time slots #5 to #9). With this setup, the CPUs #0 to #3 execute parallel processes A1 to A4 produced from the first parallel program A, during the period of time slots #0 to #4. Likewise, the CPUs #0 to #3 execute parallel processes B1 to B4 produced from the second parallel program B, during the period of time slots #5 to #9.

The two parallel programs A and B start at the same time as shown in FIG. 10. The first parallel program A completes earlier than the second parallel program B because of its shorter length of required computation time, and after that, the second parallel program B solely runs at the allocation ratio of 100 percent. After all, the first parallel program A finishes in two days after its start, and the second parallel program B finishes in five days after its start.

Figure 11:
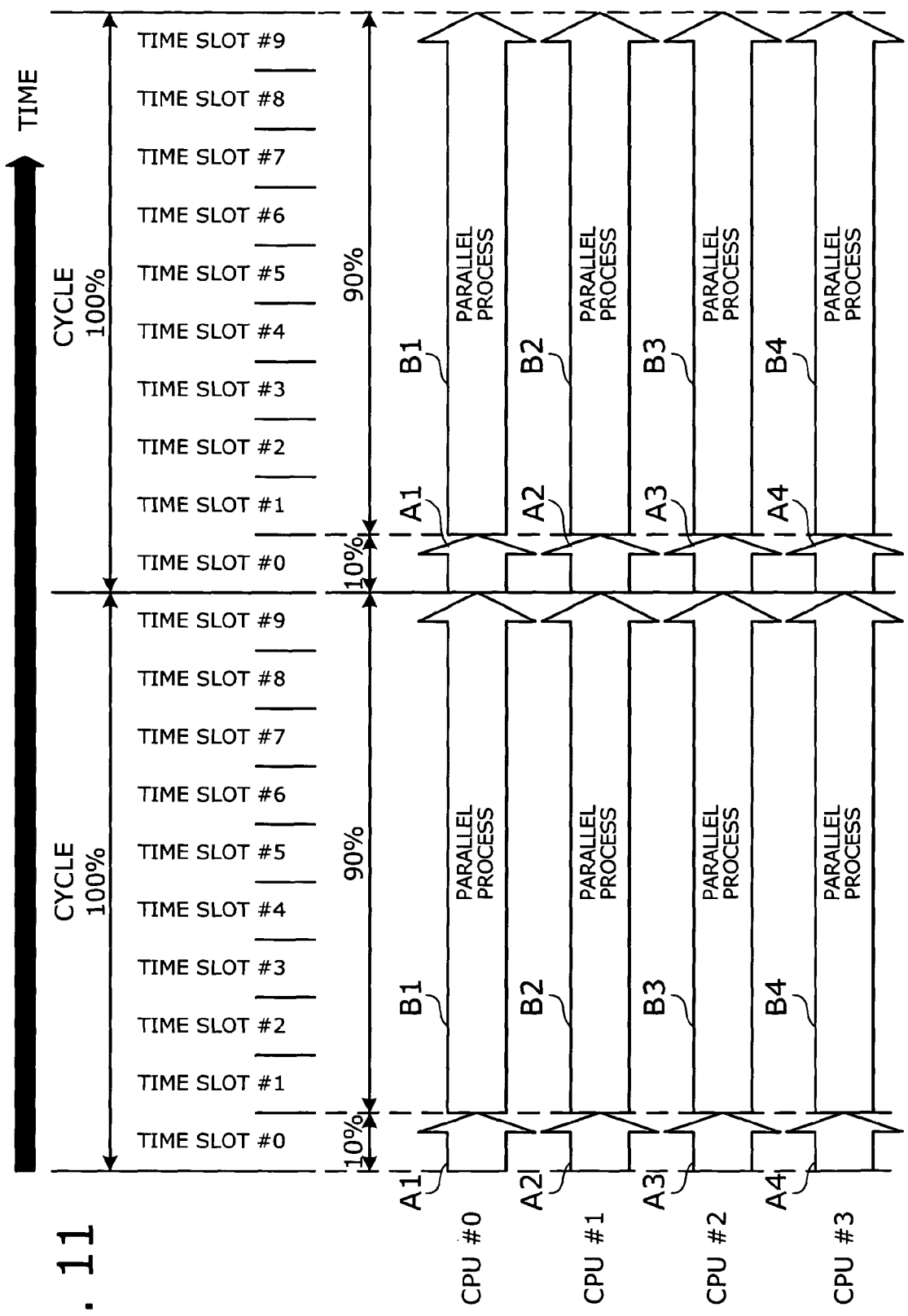
FIG. 11 shows an example of process switching when the time allocation ratio is set to 1:9.

FIG. 11 shows an example of process switching when the time allocation ratio is set to 1:9. In this example, the first parallel program A is assigned an allocation ratio of 10 percent (time slot #0), and the second parallel program B is assigned an allocation ratio of 90 percent (time slots #1 to #9). With this setup, the CPUs #0 to #3 execute parallel processes A1 to A4 produced from the first parallel program A, during the period of time slot #0. Likewise, the CPUs #0 to #3 execute parallel processes B1 to B4 produced from the second parallel program B, during the period of time slots #1 to #9.

The two parallel programs A and B start at the same time. In the case shown in FIG. 11, the second parallel program B completes earlier than the first parallel program A in spite of the longer computation time that it requires. After the second parallel program B is finished, the first parallel program A solely runs at the allocation ratio of 100 percent. After all, the parallel program A finishes in five days after its start, while the parallel program B finishes in 4.4 days after its start. As can be seen from this example, we can allocate available CPU time to a plurality of parallel programs at any ratios, which makes it possible to finish a particular parallel program first even if it requires a longer computation time than others.

Figure 12:
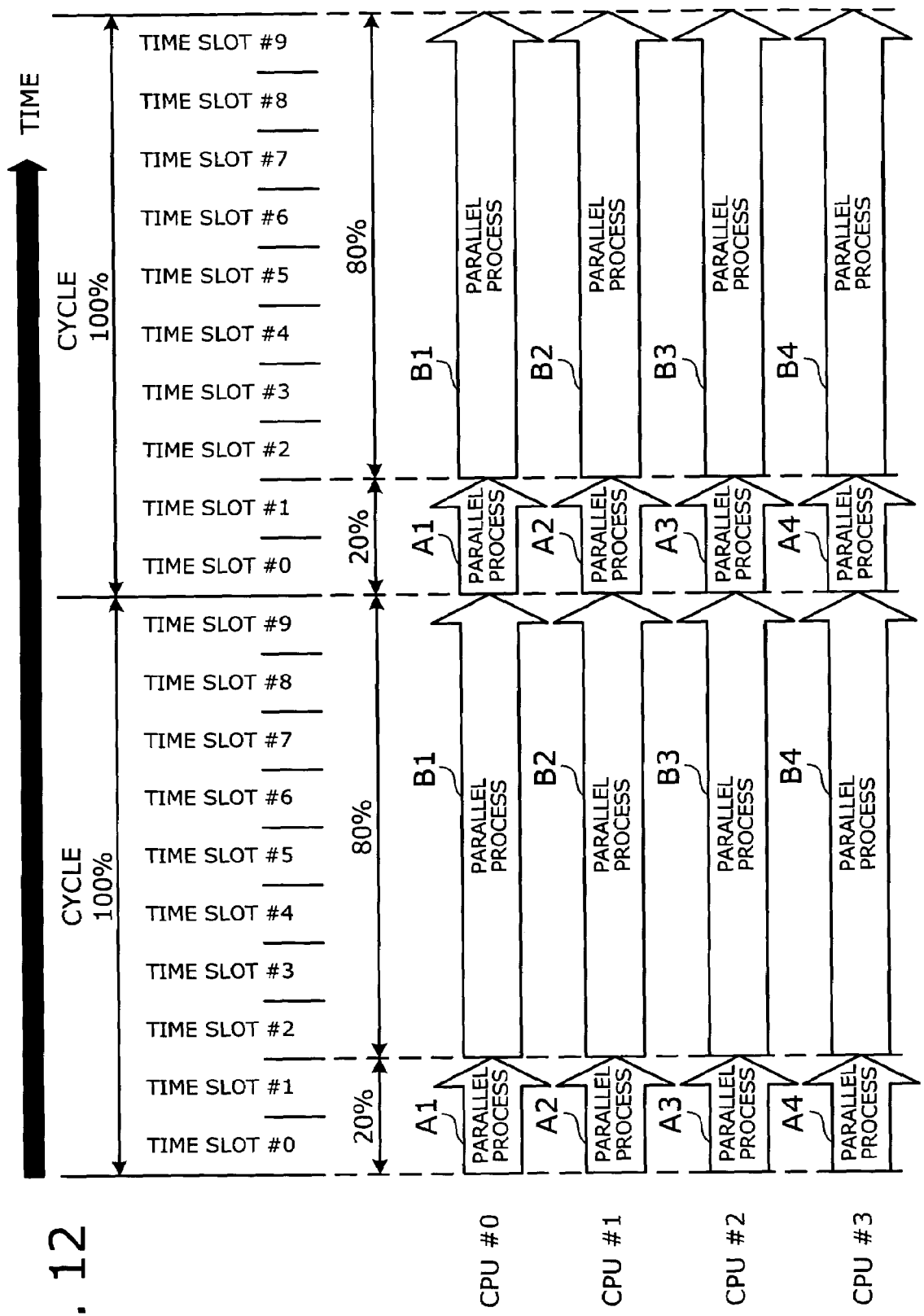
FIG. 12 shows an example of process switching when the time allocation ratio is set to 2:8.

FIG. 12 shows an example of process switching when the time allocation ratio is set to 2:8. In the example of FIG. 12, the first parallel program A is assigned an allocation ratio of 20 percent (time slots #0 and #1), and the second parallel program B is assigned an allocation ratio of 80 percent (time slots #2 to #9). With this setup, the CPUs #0 to #3 execute parallel processes A1 to A4 produced from the first parallel program A, during the period of time slots #0 and #1. Likewise, the CPUs #0 to #3 execute parallel processes B1 to B4 produced from the second parallel program B, during the period of time slots #2 to #9.

The two parallel programs A and B start at the same time. In the case shown in FIG. 12, they finish at nearly the same time. That is, both programs A and B finish in five days after their start. This example demonstrates that, by allocating available CPU time to a plurality of parallel programs at an appropriate ratio, we can finish a plurality of parallel programs at the same time in spite of their different computation time requirements.

In the following section, we will now explain how differently the processes are switched, depending on what scheduling policy is taken.

Figure 13:
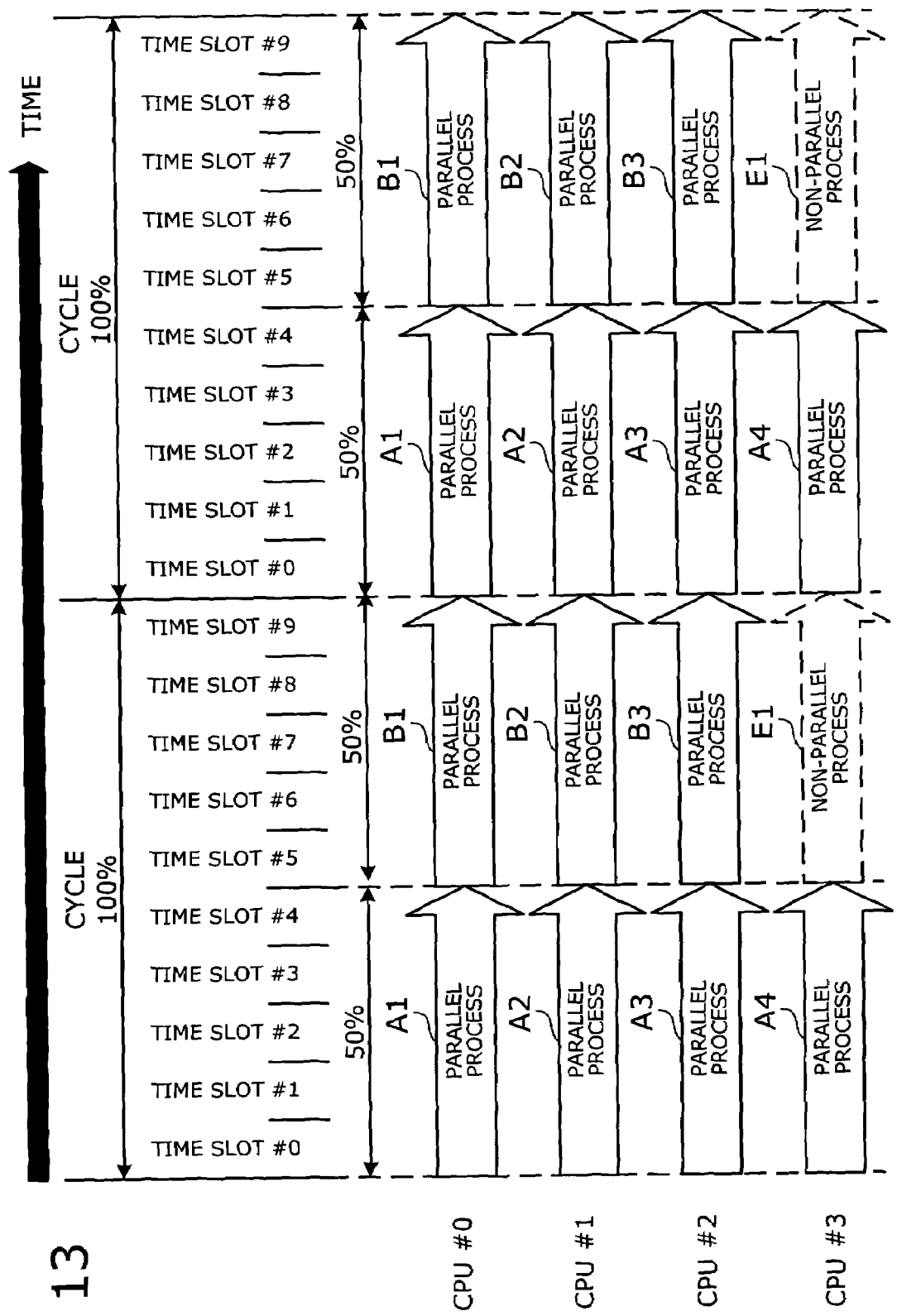
FIG. 13 shows an example of process switching under a throughput-first policy when running parallel programs and non-parallel programs in a time-shared manner.

FIG. 13 shows an example of process switching when running parallel programs and non-parallel programs in a time-shared manner under a throughput-first policy. It is assumed here that four CPUs #0 to #3 execute a parallel program A during the period of time slots #0 to #4, and the CPUs #0 to #2 execute another parallel program B during the period of time slots #5 to #9, while nothing is assigned to the CPU #3 in the same time slots #5 to #9. It is also assumed that besides the parallel programs A and B, yet another parallel program E is to be executed, and that there are no interactive processes being invoked.

In the example of FIG. 13, the CPUs #0 to #3 respectively execute four parallel processes A1 to A4 produced from the first parallel program A, during the period of time slots #0 to #4. During the subsequent time slots #5 to #9, the first three CPUs #0 to #2 execute parallel three processes B1 to B3 produced from the second parallel program B, while the fourth CPU #3 executes a non-parallel process produced from the third parallel program E. As this example shows, we can improve the efficiency of and increase the throughput of the system as a whole by choosing the throughput-first policy and allowing free time slots to be used for execution of non-parallel processes.

Figure 14:
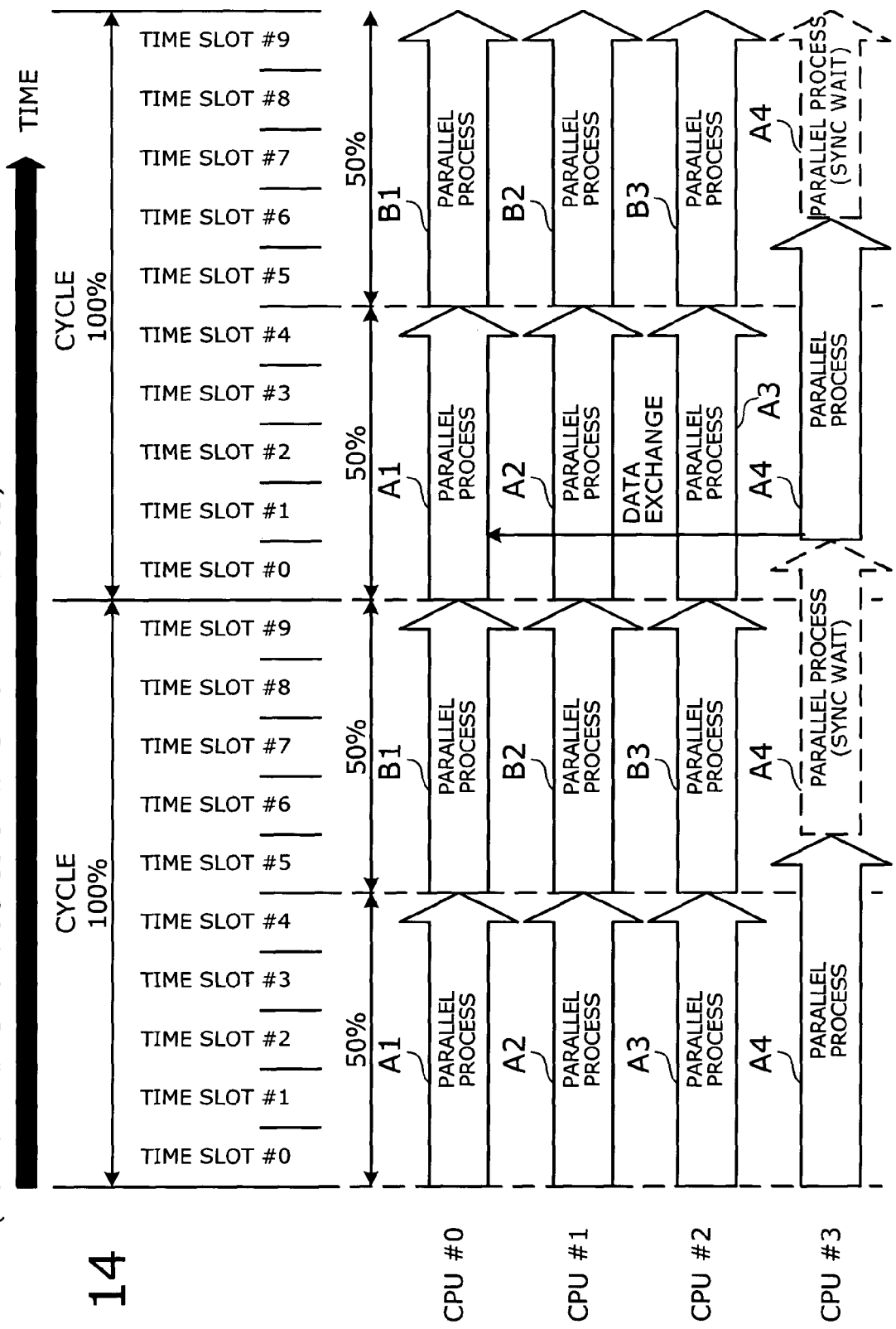
FIG. 14 shows an example of process switching under a throughput-first policy when the system has no programs to run other than a given parallel program.

FIG. 14 shows an example of process switching under a throughput-first policy when the system has no programs to run other than a given parallel program. It is assumed here that four CPUs #0 to #3 execute a parallel program A during the period of time slots #0 to #4, and that the first three CPUs #0 to #2 execute another parallel program B during the period of time slots #5 to #9, while nothing is assigned to the fourth CPU #3 in the same time slots #5 to #9. It is also assumed that, other than the two parallel programs A and B, there are neither interactive processes nor any other pending processes.

In the example of FIG. 14, the CPUs #0 to #3 respectively execute four parallel processes A1 to A4 produced from the first parallel program A, during the period of time slots #0 to #4. Likewise, the first three CPUs #0 to #2 respectively execute three parallel processes B1 to B3 produced from the second parallel program B, during the subsequent time slots #5 to #9.

Further, during the same period of time slots #5 to #9, the fourth CPU #3 continue to execute the parallel process A4 produced from the parallel program A. The parallel process A4, however, has a check point where it needs to exchange some data with (or synchronize itself with) other parallel processes. When such a checkpoint is reached during this period, the CPU #3 enters a wait state in which it has to synchronize. It cannot leave this state until the next cycle in which the other CPUs #0 to #2 become ready to communicate with the CPU #3 as a result of the progress of their execution of parallel processes A1 to A3.

As can be seen from the above example, the throughput-first policy allows parallel processes to use free time slots unless there are no pending non-parallel processes or interactive processes. This policy thus improves the efficiency (throughput) of the system as a whole. It should be noted, however, that the time consumed by a parallel process in waiting synchronization has to be accounted as part of the processing time of that parallel process. That is, in the case the customers of a server computer are billed according to the CPU time used by them, they would have to pay for the time in which the CPU is only repeating a loop for waiting synchronization. This means that, even if the same parallel program is executed, the charge may vary depending on whether or not there are free time slots on the schedule. To address the above issue, the turnaround-first policy is to be chosen when customers wish to pay the same fee for the same parallel program. The turnaround-first policy can also be the choice of customers who wish guaranteed turnaround.

Figure 15:
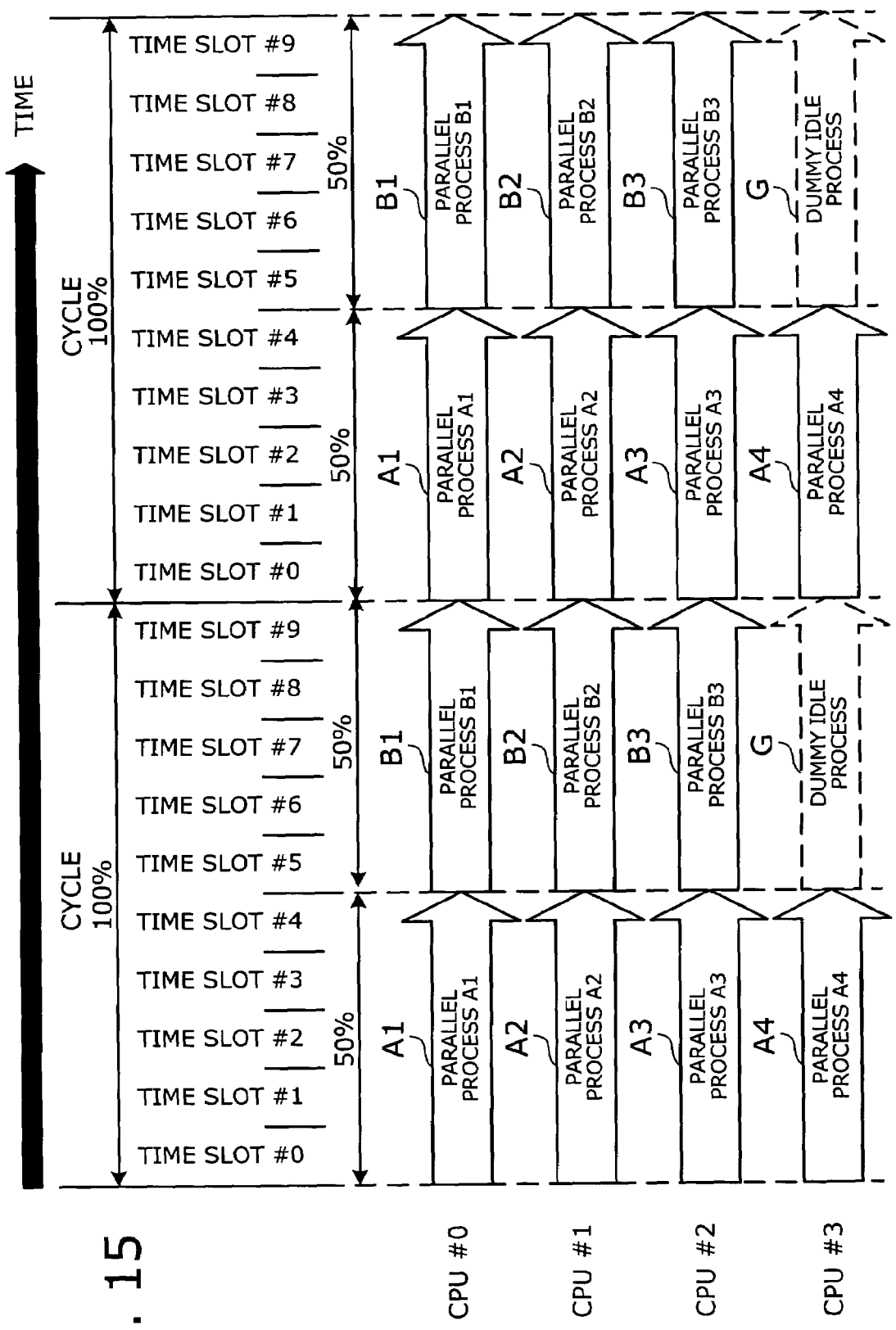
FIG. 15 shows an example of process switching under a turnaround-first policy.

FIG. 15 shows an example of process switching under the turnaround-first policy. It is assumed here that four CPUs #0 to #3 execute a parallel program A during the period of time slots #0 to #4, and that the first three CPUs #0 to #2 execute another parallel program B during the subsequent time slots #5 to #9, while nothing is assigned to the fourth CPU #3 in the same time slots #5 to #9.

In the example of FIG. 15, four CPUs #0 to #3 respectively execute four parallel processes A1 to A4 produced from the first parallel program A, during the period of time slots #0 to #4. Likewise, the first three CPUs #0 to #2 respectively execute parallel processes B1 to B3 produced from the second parallel program B, during the subsequent time slots #5 to #9. During the same period of time slots #5 to #9, the fourth CPU #3 executes a dummy idle process G. Since the time consumed by the dummy idle process G will not be accounted as part of the processing time of that parallel process, the total amount of time that each parallel program occupies each CPU does not depend on the presence of vacant time slots. Accordingly, the customers are billed the same amount of fee as long as the executed parallel programs have the same content.

In the next section, we will describe an example of parallel processing using a plurality of computers (hereafter, "nodes").

Figure 16:
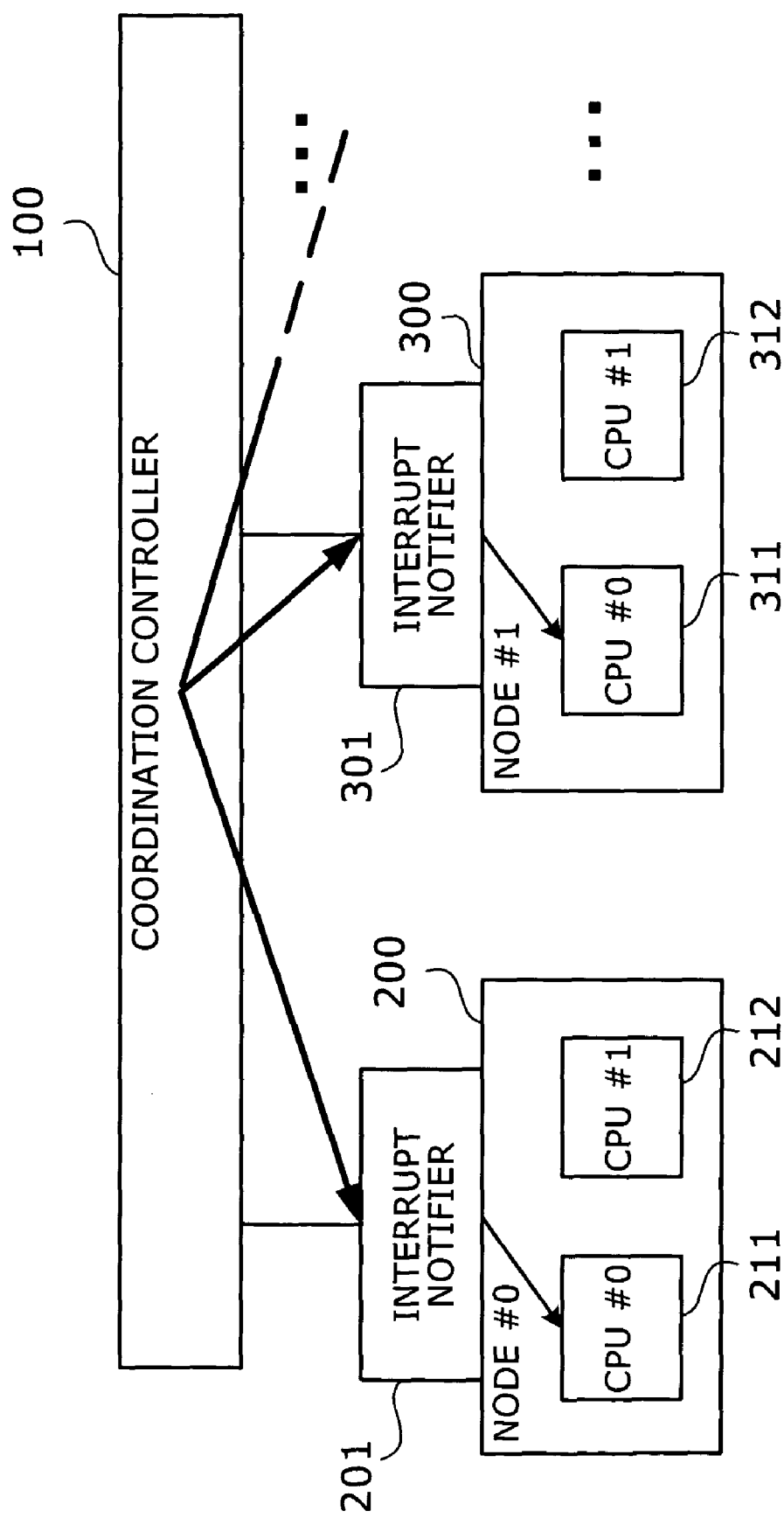
FIG. 16 shows an example system configuration for distributed parallel processing with a plurality of nodes.

FIG. 16 shows an example system configuration for distributed parallel processing with a plurality of nodes. In this example, a coordination controller 100 is linked with a plurality of nodes 200 and 300 via interrupt notifiers 201 and 301. One node 200 has a plurality of CPUs 211 and 212. Likewise, the other node 300 has a plurality of CPUs 311 and 312.

The coordination controller 100 controls coordinated operations among distributed nodes. For instance, the coordination controller 100 transfers data from one node to another. Also, the coordination controller 100 delivers an interrupt signal to each node for the purpose of synchronization when the system starts up.

The interrupt notifiers 201 and 301 receive an interrupt signal from the coordination controller 100 and notifies predetermined CPUs in their respective nodes of that interrupt signal. For example, one interrupt notifier 201, which is connected to the node 200, notifies the CPU 211 of such an interrupt signal. The other interrupt notifier 301, which is connected to the node 300, notifies the CPU 311 of such an interrupt signal. When an interrupt signal is indicated, the receiving CPUs 211 and 311 at the nodes 200 and 300 initialize their time slots and schedule their local CPU interrupts in their respective nodes.

Figure 17:
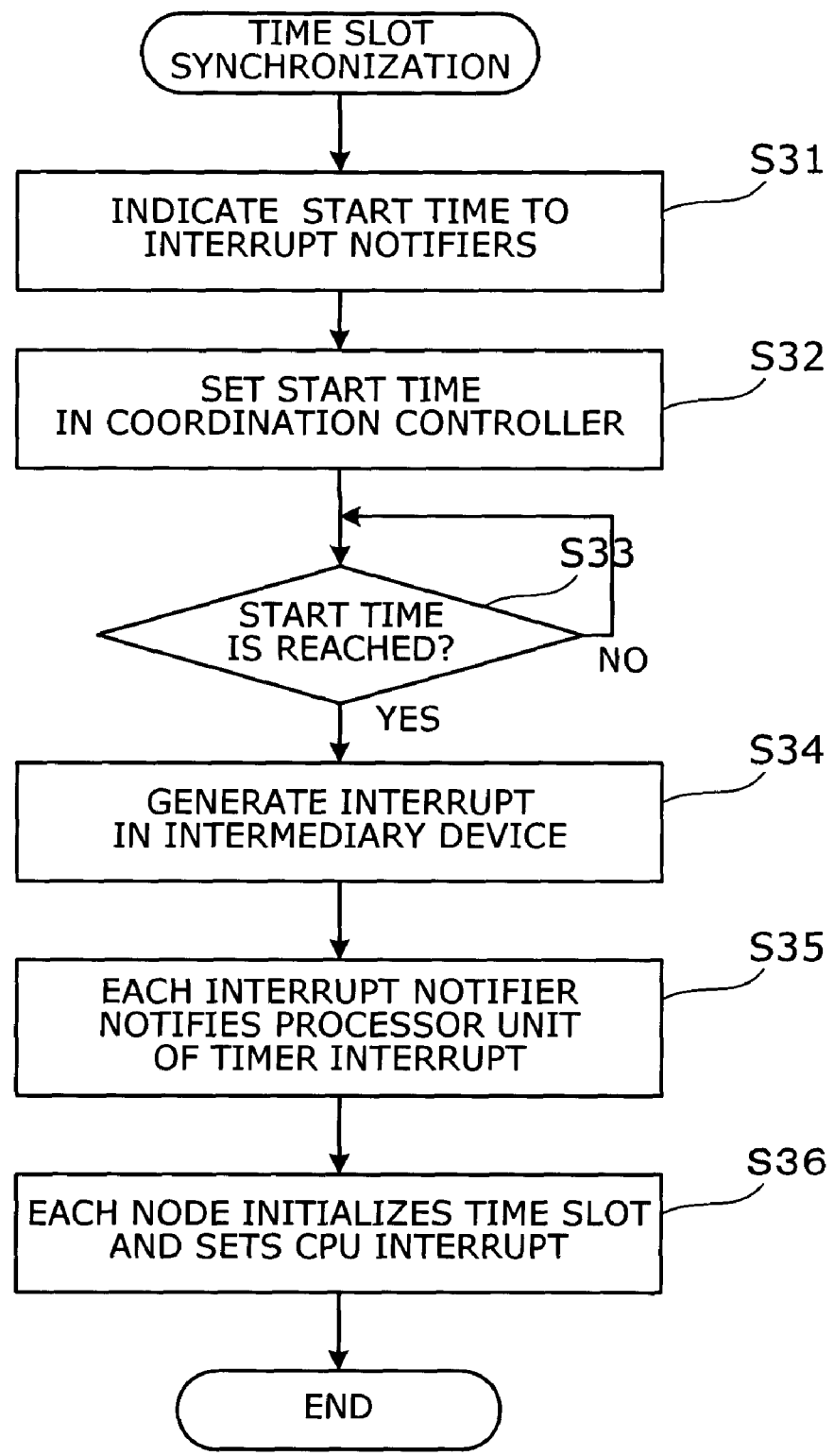
FIG. 17 is a flowchart of a task to synchronize time slots among a plurality of nodes.

FIG. 17 is a flowchart of a task that synchronizes time slots among a plurality of nodes. The following explains the task of FIG. 17 in the order of step numbers shown therein. It is assumed, in the example of FIG. 17, that the interrupt notifier 201 attached to the node 200 is used to set up an interrupt timer.

(S31) The node 200 indicates the start time of parallel processing to the interrupt notifier 201. More specifically, the operating system running on the node 200 indicates the start time to the interrupt notifier 201 in response to an input operation by the user.

(S32) The interrupt notifier 201 notifies the coordination controller 100 of the start time. This causes a timer in the coordination controller 100 to be programmed so that it will generate an interrupt at the start time specified.

(S33) Based on the timer setting, the coordination controller 100 determines whether the start time is reached. If it is reached, the task proceeds to step S34. If it has not been reached, the task repeats this step S33.

(S34) When the timer reaches the preset start time, the coordination controller 100 sends a timer interrupt to all interrupt notifiers 201 and 301 connected to the coordination controller 100.

(S35) Upon receipt of the timer interrupt, the interrupt notifiers 201 and 301 notify predetermined CPUs in their respective nodes of the timer interrupt.

(S36) Being notified of the timer interrupt, each CPU invokes an interrupt handler routine (program) that has been prepared beforehand. This interrupt handler initializes the time slot (e.g., the present time slot number is set to #0), and schedules CPU interrupts (i.e., simultaneous interrupt signals are to be generated to all CPUs in a node at predefined times). Here, the CPU interrupts are scheduled in such a way that all CPUs equipped in all nodes will receive an interrupt at the same time.

As can be seen from the above steps, simultaneous interrupts occur to all CPUs in each node as scheduled beforehand, which commences the cycle of time slot switching tasks.

Figure 18:
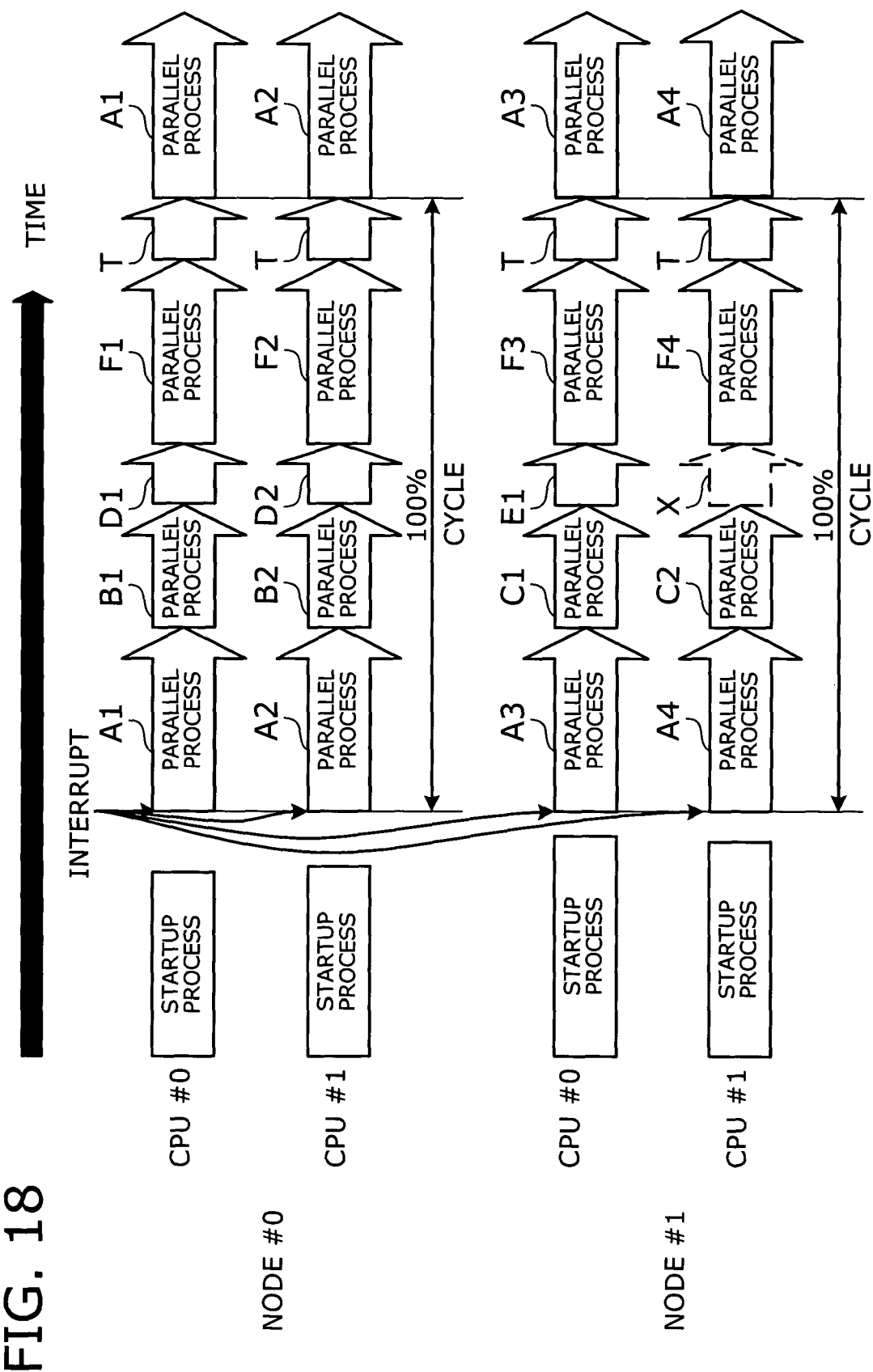
FIG. 18 shows an example of how processes are switched when inter-node synchronization is established.

FIG. 18 shows an example of how processes are switched when inter-node synchronization is established. The example of FIG. 18 represents what each CPU does in the case two nodes #0 and #1 are activated at the same time. When the nodes #0 and #1 are activated together, each CPU executes its startup task, which includes self testing and loading of a particular boot program, for example. The completion time of those startup tasks may vary from CPU to CPU. Each CPU waits for a CPU interrupt after its own startup task is finished. Afterwards, when all CPUs have completed their startup tasks, an interrupt is generated to all of them, making each CPU start switching time slots to run a given process in each time slot as specified in the time slot allocation map.

The above-described system synchronizes a plurality of nodes in time slot switching, making it possible for those nodes to execute parallel processes produced from a parallel program in a distributed manner. If there was no synchronization mechanism for time slot switching, parallel processes derived from a parallel program could be executed in separate nodes at different times. This means that some parallel processes running on different nodes could experience an intolerable amount of synchronization wait time in exchanging data with each other. Synchronization of time slot switching operations solves the above problem since it causes every parallel process to start at the same time in a plurality of distributed nodes, as well as complete execution at the same time. This makes it possible to minimize the amount of synchronization wait time that is associated with data exchange operations.

As can be seen from the above explanation, according to one embodiment of the present invention, the CPU time can be divided for execution of parallel programs at any desired time allocation ratio, which enables the system to guarantee the turnaround time. This guaranteed turnaround time is beneficial when we need to run the same program repeatedly at regular intervals, because that program can always complete within a known time period, regardless of whether any other programs are running together. If it is possible to estimate the completion time of a job, we can proceed to the next work as scheduled, using the result of that first job. Think of, for example, data processing for weather forecasts. The proposed system can always finish the analysis of weather data a predetermined time before the scheduled release of new weather forecast information, no matter how the system is burdened with other jobs.

The capability of allocating CPU time for parallel programs at desired time allocation ratios further enables us to give different weights to different batch processes. That is, important batch processes will be allocated a larger CPU time ratio. This allows those important batch processes to complete earlier than less important ones. As another possible application, we will be able to make a time-consuming batch process finish concurrently with other batch processes.

The present invention also permits interactive processes to use their dedicated time slots, ensuring that they can run at regular intervals. Without this capability, batch processes are executed in the first place in every time slot when all time slots are assigned to batch processes (e.g., parallel processes). This forces interactive processes to wait until all the ongoing batch processes are finished. The present embodiment provides particular time slots for interactive processes, in which the priority of batch processes is set to the lowest level. This feature guarantees the ratio of CPU time that is allocated to interactive processes as a whole.

Also, according to the present embodiment, we can choose a desired scheduling policy, either throughput-first or turnaround-first policy. With this feature, we can put a higher priority to the throughput or turnaround, depending on the actual customer needs. More specifically, the present embodiment allows us to specify, to the system as a whole, whether to run parallel processes in a free time slot where no processes are assigned.

For example, throughput-first policy would be selected if the customer does not care much about the charge and if the system mainly handles such parallel processes that do not need synchronization too often. In this case, either process is executed using free time slots. The total system throughput becomes higher with this policy. Also, when determining which process to assign to an available vacant time slot, the system prioritizes pending processes in the following order: interactive processes, non-parallel processes, and parallel processes. This means that the process assigned to such a vacant slot is less likely to enter a synchronization wait state.

On the other hand, in the case the system mainly executes such parallel processes that need frequent synchronization operations, running parallel processes in unassigned time slots is nothing but a waste of CPU power. It brings no gain in the total system throughput, and in addition, it invites deviation in the amount of charge that is to be billed. The turnaround-first policy is appropriate in those cases, which avoids running parallel processes in free time slots and thus prevents CPU power from being wasted.

The present invention further provides synchronization of time slot cycles between a plurality of CPUs when they are distributed over a plurality of nodes. Those nodes execute a plurality of parallel process produced from a single parallel program, and the synchronized time slot timings minimize the chance for the parallel processes to encounter synchronization wait, as small as that in the case they are executed together in a single node. That is, the present invention prevents the efficiency of computation from being reduced as a result of parallel processing over a plurality of nodes.

In an earlier section, we have described parallel processing with a multiple-CPU system, in which CPUs are arranged to operate in a coordinated way by executing processes according to a given schedule. It is also possible to schedule coordinated operations between a plurality of threads if they are in a single node. In other words, we can provide an allocation map for scheduling time slots in such a way that the CPUs will be assigned a task, one thread for each.

The processing functions that we have described above are encoded in a computer program, which is stored in a computer-readable storage medium. A computer executes this program to provide the functions described above. Such computer-readable storage media include magnetic storage devices and semiconductor memory devices. Portable storage media, such as compact disk read-only memory (CD-ROM) and floppy disks, are suitable for circulation purposes. Further, the program may be stored in a storage device of a computer that is deployed on a network for distribution to other computers over the network. Such programs are normally installed in a computer's hard disk drive or other storage device, which can be executed after being loaded to the main memory.

As can be seen from the above discussion, according to the present invention, an appropriate time allocation ratio is set to a parallel program, which enables parallel processes start simultaneously on the plurality of processors. When the elapsed time has reached a point that corresponds to the time allocation ratio, the parallel processes are stopped simultaneously. This mechanism enables us to allocate the processor time for execution of parallel programs at any desired time allocation ratio, thus making it possible to guarantee the turnaround time.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A parallel process execution method with which a plurality of processors execute a plurality of parallel processes produced from a parallel program together with other processes in a time-shared fashion, the method comprising the steps of:
   (a) setting a time allocation ratio that determines how much of a given cycle period should be allocated for execution of the parallel program, wherein said setting step sets the time allocation ratio to the parallel program by dividing the given cycle period into a plurality of time slots and determining which process to execute in each time slot of the different processors;
   (b) providing a set of criteria beforehand for use in determining what to execute in a free time slot that has no process assigned, wherein the set of criteria including a throughput-first policy which allows batch processes to run in the free time slot and a turnaround-first policy which allows no batch process to run in the free time slot;
   (c) according to the set of criteria, selecting either the throughput-first policy or the turnaround-first policy at each of the processors which process to be executed in the free time slot;
   (d) assigning each parallel process of the parallel program to one of the plurality of processors, and starting execution of the assigned parallel processes simultaneously-on the plurality of processors; and
   (e) stopping the execution of the assigned parallel processes simultaneously on the plurality of processors, when the time elapsed since the start of the parallel processes has reached a point that corresponds to the time allocation ratio that has been set to the parallel program.

2. The parallel process execution method according to claim 1, wherein the processes to be executed in the time slots include interactive processes.

3. The parallel process execution method according to claim 1, wherein the throughput-first policy gives successively lower priorities to interactive processes, non-parallel processes for execution on a single processor, and parallel processes.

4. The parallel process execution method according to claim 1, wherein the processors are grouped into a plurality of nodes, and the method further comprises the steps of:
   causing simultaneous interrupts to the nodes;
   sending the received interrupts simultaneously to every processor in the nodes; and
   causing the processors to start the cycle period in phase with the interrupts.

5. A multiprocessor computer which employs a plurality of processors to execute a plurality of parallel processes produced from a parallel program together with other processes in a time-shared fashion, comprising:
   a time allocation ratio setting unit that sets a time allocation ratio that determines how much of a given cycle period should be allocated for execution of the parallel program, and provides a set of criteria beforehand for use in determining what to execute in a free time slot that has no process assigned, wherein the set of criteria including a throughput-first policy which allows batch processes to run in the free time slot, and a turnaround-first policy which allows no batch process to run in the free time slot, wherein said time allocation ratio setting unit divides the given cycle period into a plurality of time slots and determines which process to execute in each time slot of the different processors; and
   a process execution unit that causes each of the processors to select either the throughput-first policy or the turnaround-first policy, according to the set of criteria, which process to execute in the free time slot, assigns each parallel process of the parallel program to one of the plurality of processors, starts execution of the assigned parallel processes simultaneously on the plurality of processors, and stops the execution of the assigned parallel processes simultaneously on the plurality of processors when the time elapsed since the start of the parallel processes has reached a point that corresponds to the time allocation ratio.

6. A multiprocessor computer system for executing a plurality of parallel processes produced from a parallel program together with other processes in a time-shared fashion, the multiprocessor computer system comprising:
   a plurality of nodes, each comprising at least one processor; and
   a coordination controller that generates interrupt notifications to the plurality of nodes simultaneously;
   wherein each node comprises:
   a time allocation ratio setting unit that sets a time allocation ratio that determines how much of a given cycle period should be allocated for execution of the parallel program, wherein said time allocation ratio setting unit divides the given cycle period into a plurality of time slots and determines which process to execute in each time slot of the different processors;
   provides a set of criteria beforehand for use in determining what to execute in a free time slot that has no process assigned, wherein the set of criteria including a throughput-first policy which allows batch processes to run in the free time slot and a turnaround-first policy which allows no batch process to run in the free time slot;

a process execution unit that causes each of the processors to select either the throughput-first policy or the turnaround-first policy, according to the set of criteria, which process to be executed in the free time slot; and a process execution unit assigns each parallel process of the parallel program to processors, starts execution of the assigned parallel processes simultaneously on the processors, and stops the execution of the assigned parallel processes simultaneously on the processors when the time elapsed since the start of the parallel processes has reached a point that corresponds to the time allocation ratio that has been set to the parallel program.

7. A parallel process execution program for use with a plurality of processors to execute a plurality of parallel processes produced from a parallel program together with other processes in a time-shared fashion, the program causing a computer to perform the steps of:

setting a time allocation ratio that determines how much of a given cycle period should be allocated for execution of the parallel program, wherein said setting step sets the time allocation ratio to the parallel program by dividing the given cycle period into a plurality of time slots and determining which process to execute in each time slot of the different processors;

providing a set of criteria beforehand for use in determining what to execute in a free time slot that has no process assigned, wherein the set of criteria including a throughput-first policy which allows batch processes to run in the free time slot, and a turnaround-first policy which allows no batch process to run in the free time slot;

according to the set of criteria, selecting either the throughput-first policy or the turnaround-first policy at each of the processors which process to be executed in the free time slot;

assigning each parallel process of the parallel program to one of the plurality of processors, and starting execution of the assigned parallel processes simultaneously on the plurality of processors; and stopping the execution of the assigned parallel processes simultaneously on the plurality of processors, when the time elapsed since the start of the parallel processes has reached a point that corresponds to the time allocation ratio that has been set to the parallel program to allocate the given cycle period.

8. A computer-readable storage medium storing a program for use with a plurality of processors to execute a plurality of parallel processes produced from a parallel program together with other processes in a time-shared fashion, the program when executed by a plurality of processors causing the computers to perform the steps of:

setting a time allocation ratio that determines how much of a given cycle period should be allocated for execution of the parallel program, wherein said setting step sets the time allocation ratio to the parallel program by dividing the given cycle period into a plurality of time slots and determining which process to execute in each time slot of the different processors;

providing a set of criteria beforehand for use in determining what to execute in a free time slot that has no process assigned, wherein the set of criteria including a throughput-first policy which allows batch processes to run in the free time slot, and a turnaround-first policy which allows no batch process to run in the free time slot;

according to the set of criteria, selecting either the throughput-first policy or the turnaround-first policy at each of the processors which process to be executed in the free time slot;

assigning each parallel process of the parallel program to one of the plurality of processors, and starting execution of the assigned parallel processes simultaneously on the plurality of processors; and stopping the execution of the assigned parallel processes simultaneously on the plurality of processors, when the time elapsed since the start of the parallel processes has reached a point that corresponds to the time allocation ratio that has been set to the parallel program to allocate the given cycle period.

* * * * *